United States Patent
Kim et al.

(10) Patent No.: US 9,335,527 B2
(45) Date of Patent: May 10, 2016

(54) ZOOM LENS AND ELECTRONIC APPARATUS INCLUDING THE SAME

(71) Applicant: SAMSUNG ELECTRONICS CO., LTD., Suwon-si, Gyeonggi-do (KR)

(72) Inventors: Chang-keun Kim, Suwon-si (KR); Jung-hoi Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 14/299,405

(22) Filed: Jun. 9, 2014

(65) Prior Publication Data

US 2015/0153548 A1 Jun. 4, 2015

(30) Foreign Application Priority Data

Nov. 29, 2013 (KR) .................. 10-2013-0147816

(51) Int. Cl.
*G02B 9/34* (2006.01)
*G02B 15/16* (2006.01)
*G02B 15/173* (2006.01)
*G02B 13/00* (2006.01)
*H04N 5/232* (2006.01)

(52) U.S. Cl.
CPC .............. *G02B 15/16* (2013.01); *G02B 13/009* (2013.01); *G02B 15/173* (2013.01); *H04N 5/23296* (2013.01)

(58) Field of Classification Search
CPC .... G02B 15/16; G02B 13/009; G02B 13/001; G02B 15/14; G02B 15/173
See application file for complete search history.

(56) References Cited

U.S. PATENT DOCUMENTS

| | | | |
|---|---|---|---|
| 7,382,549 B2 | 6/2008 | Miyajima | |
| 8,014,079 B2 | 9/2011 | Matsumura et al. | |
| 8,253,845 B2 | 8/2012 | Noda | |
| 2009/0310226 A1 | 12/2009 | Sato | |
| 2013/0050843 A1* | 2/2013 | Nakamura | G02B 15/173 359/684 |

FOREIGN PATENT DOCUMENTS

| | | |
|---|---|---|
| JP | 2006-133631 A | 5/2006 |
| JP | 2011-013541 A | 1/2011 |
| JP | 2011-145674 A | 7/2011 |
| JP | 2011-164290 A | 8/2011 |

OTHER PUBLICATIONS

Extended European Search Report issued for EP 14170667.1 (Apr. 20, 2015).

* cited by examiner

*Primary Examiner* — Joseph P Martinez

(74) *Attorney, Agent, or Firm* — Drinker Biddle & Reath LLP

(57) ABSTRACT

A zoom lens includes: in an order from an object side to an image side, a first lens group having a positive refractive power; a second lens group having a negative refractive power; a third lens group having a positive refractive power; and a fourth lens group having a positive refractive power, wherein, when zooming is performed from a wide angle position to a telephoto position, the first through fourth lens groups move, and the first lens group includes a first negative lens and a second positive lens from the object side. The zoom lens may be part of an electronic apparatus, such as a photographing apparatus.

15 Claims, 25 Drawing Sheets

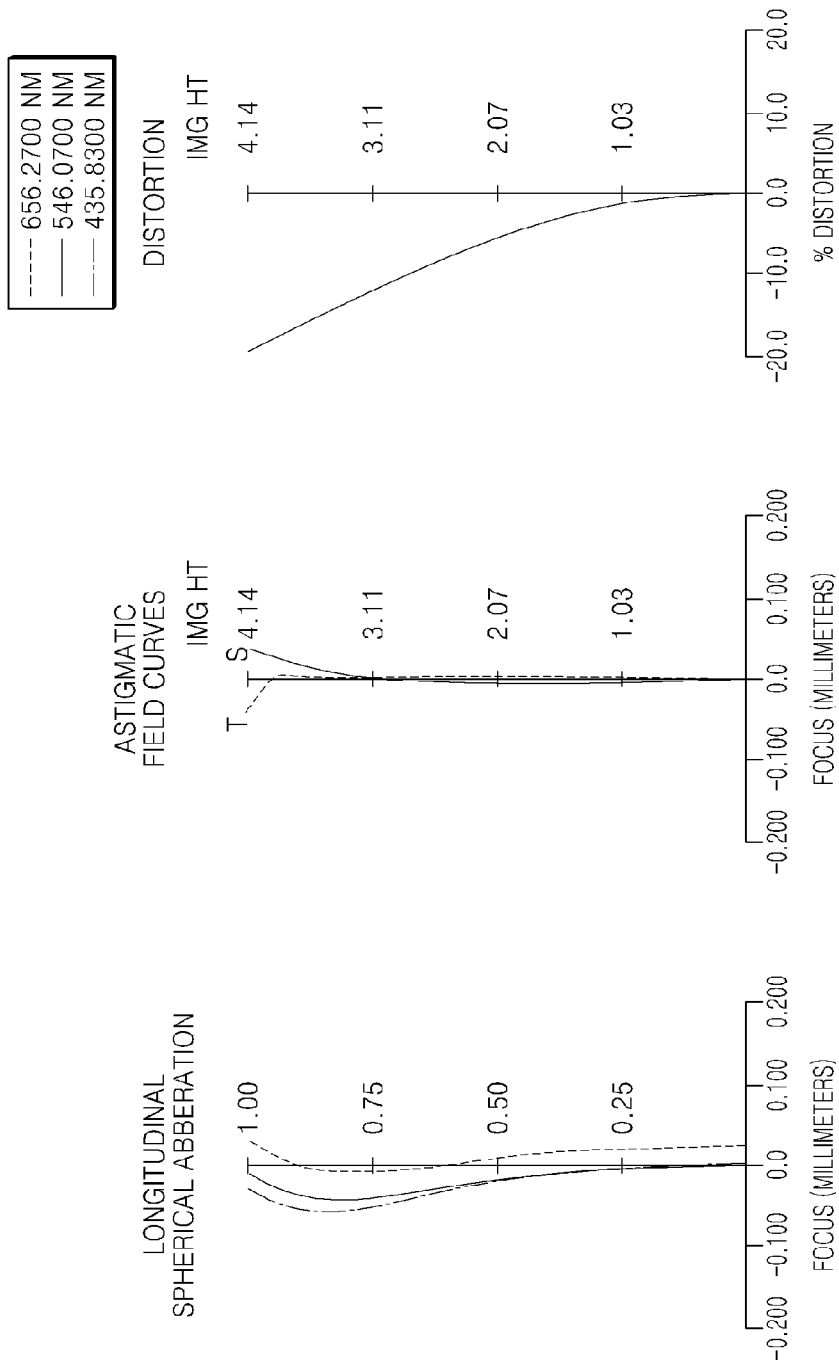

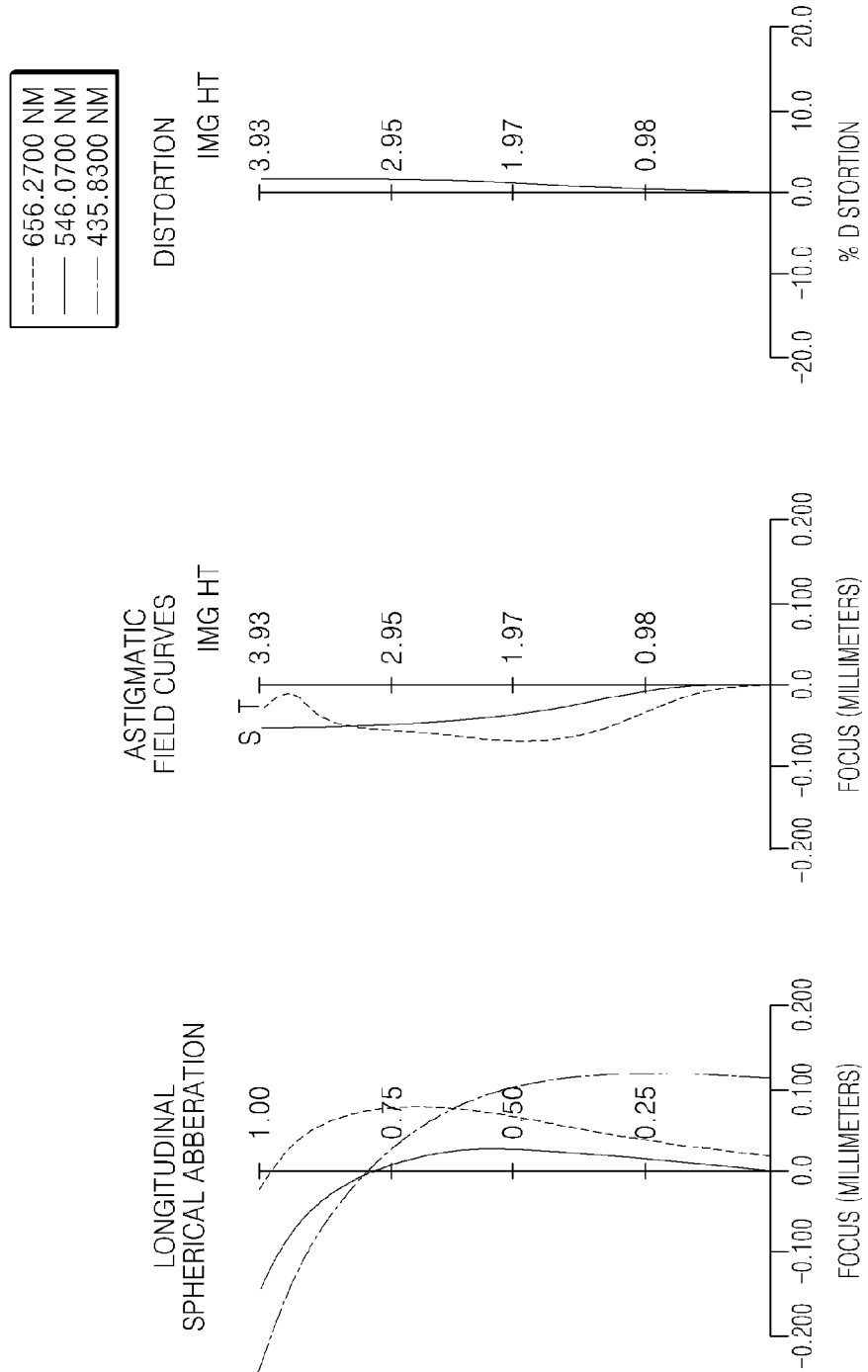

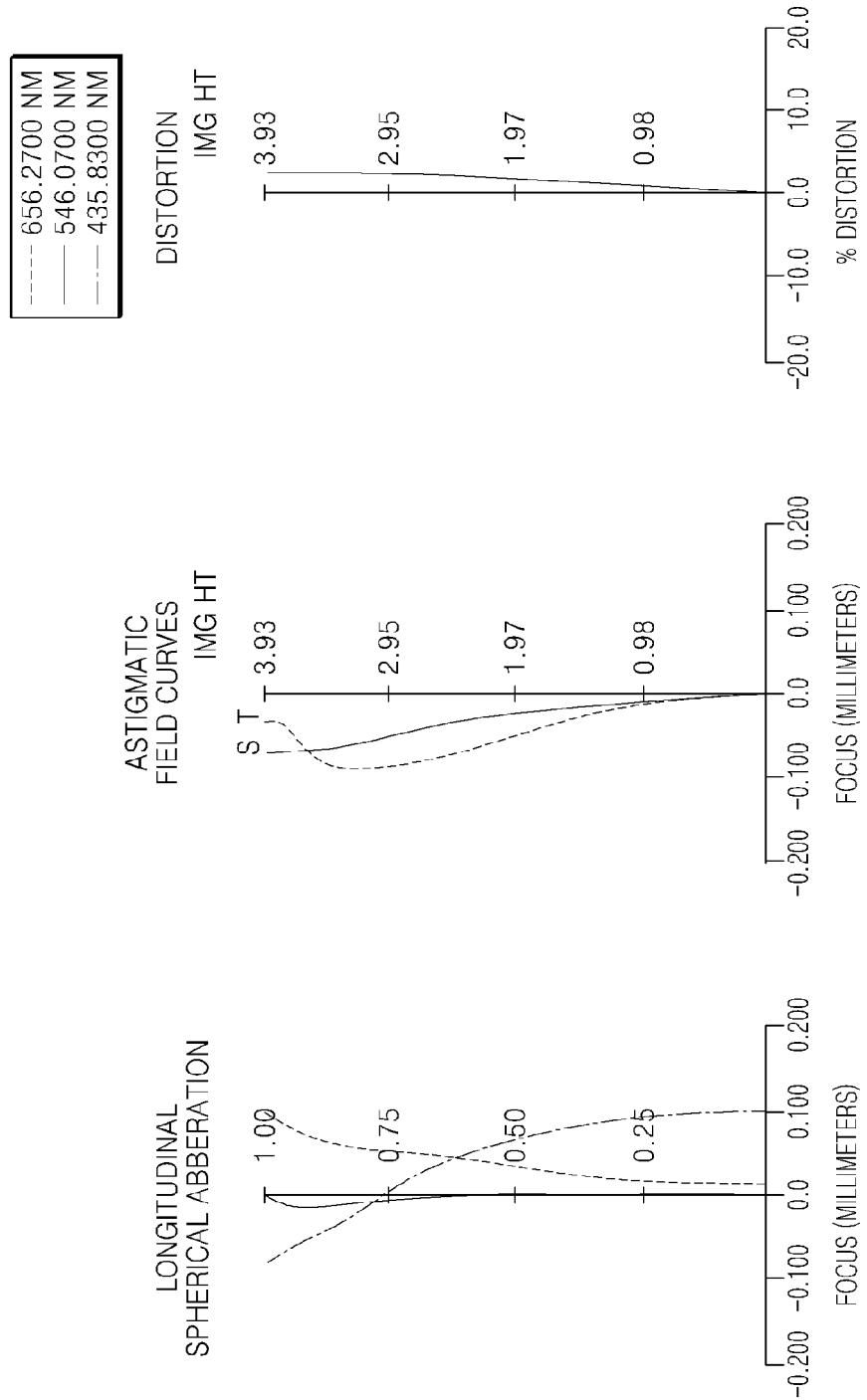

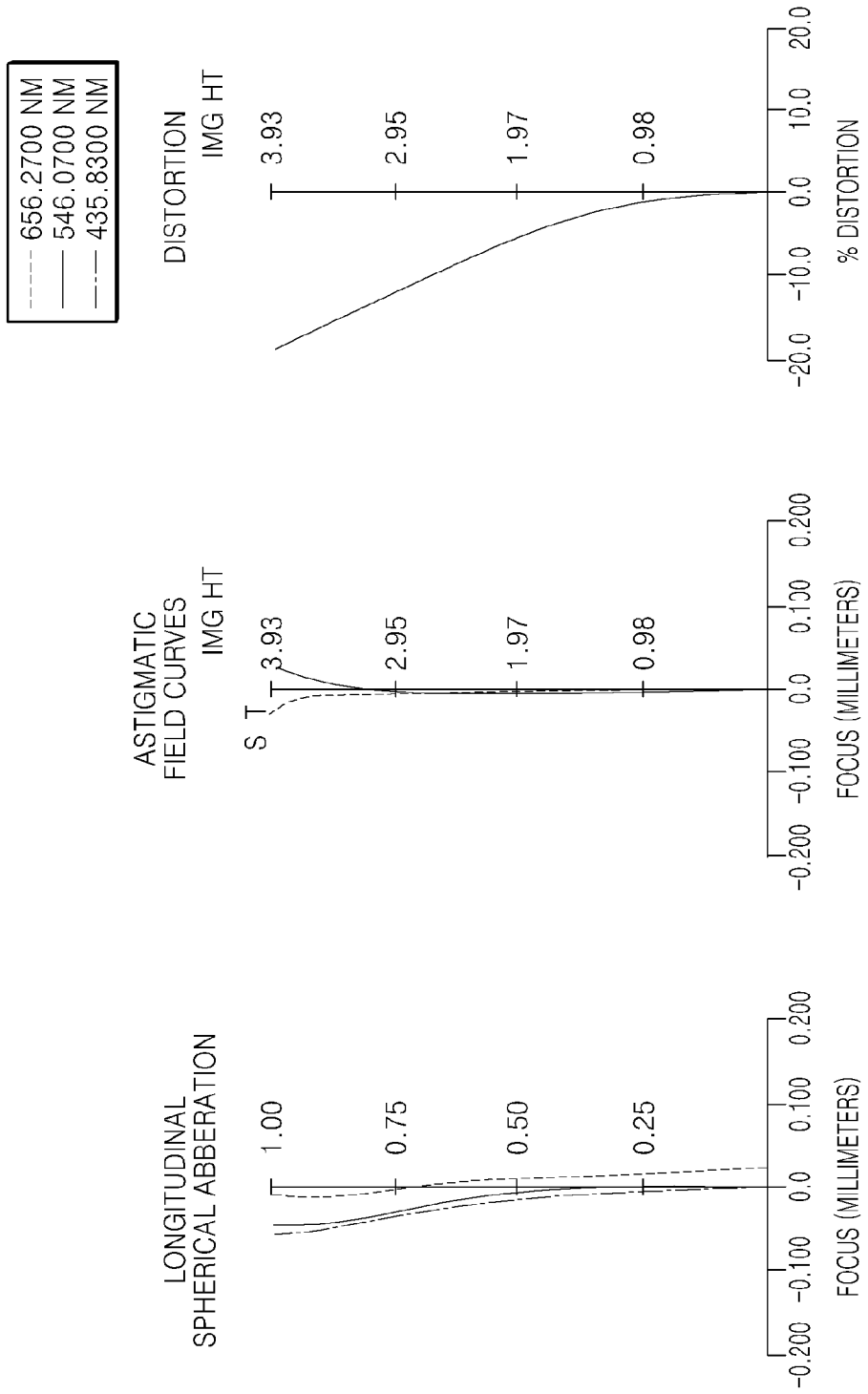

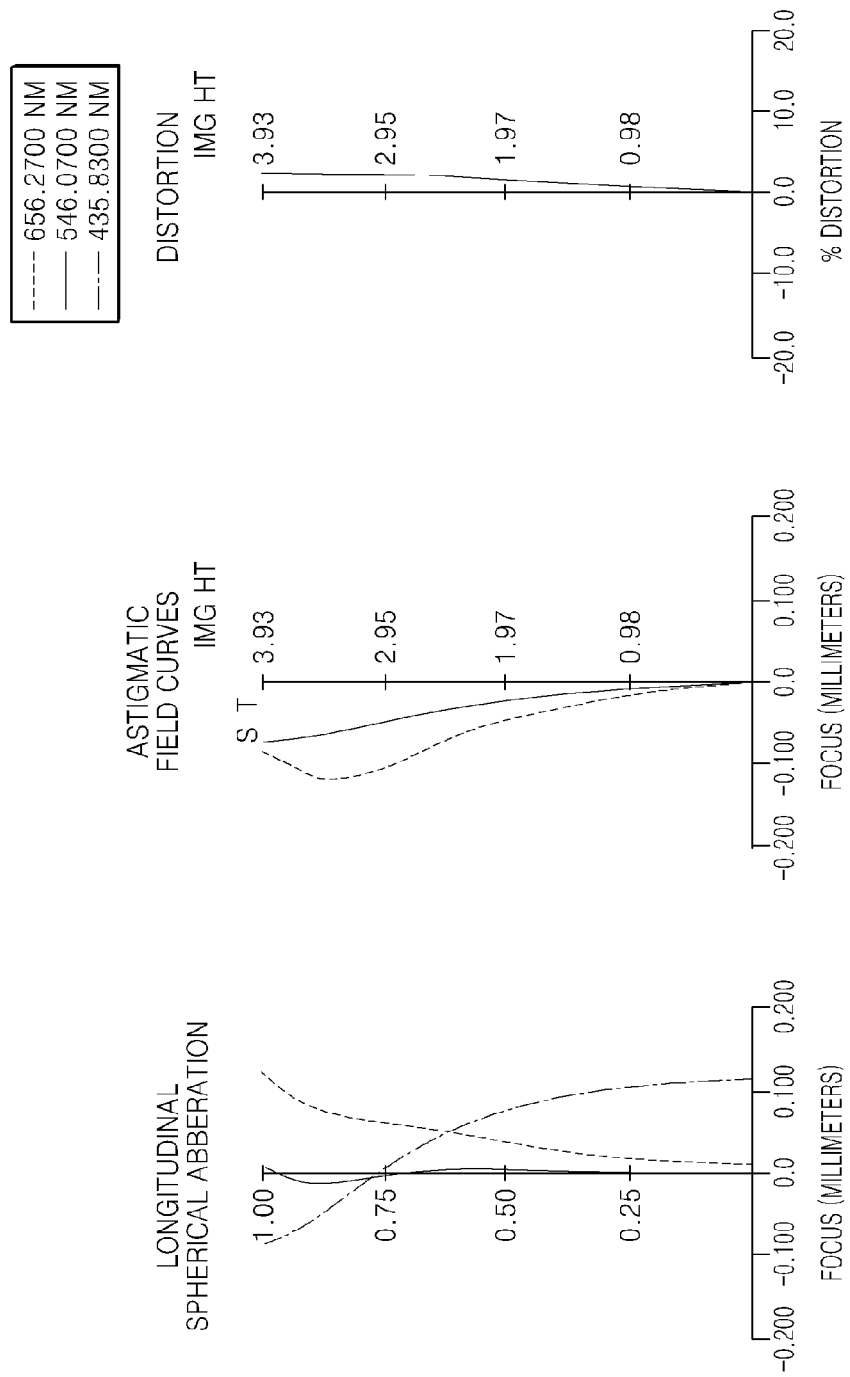

ZOOM LENS AND ELECTRONIC APPARATUS INCLUDING THE SAME

CROSS-REFERENCE TO RELATED APPLICATIONS

This application claims the priority benefit of Korean Patent Application No. 10-2013-0147816, filed on Nov. 29, 2013, in the Korean Intellectual Property Office, the disclosure of which is incorporated herein in its entirety by reference.

BACKGROUND

1. Field

One or more embodiments relate to a zoom lens having a small size and a high zoom ratio and an electronic apparatus including the zoom lens.

2. Description of the Related Art

Users of electronic devices that have photographing apparatuses (digital cameras, exchangeable lens systems, or video cameras) with solid state imaging devices demand high resolution and high magnification. Since photographing apparatuses with solid state imaging devices are suitable for miniaturization, they are used in small-sized information terminals such as mobile phones. Also, consumers' professionalism with respect to photographing apparatuses is increasing, and development of small-sized and wide-angle zoom lenses is increasing due to this market demand. However, it is difficult to achieve a small size together with high performance.

SUMMARY

One or more embodiments include a zoom lens having a small size and a high zoom ratio.

One or more embodiments include an electronic apparatus including a zoom lens having a small size and a high zoom ratio.

Additional aspects will be set forth in part in the description which follows and, in part, will be apparent from the description, or may be learned by practice of the disclosed embodiments.

According to one or more embodiments, a zoom lens includes, in an order from an object side to an image side: a first lens group having a positive refractive power; a second lens group having a negative refractive power; a third lens group having a positive refractive power; and fourth lens group having a positive refractive power, wherein, when zooming is performed from a wide angle position to a telephoto position, the first through fourth lens groups move, and the first lens group includes a first negative lens and a second positive lens from the object side, the second lens group includes a third negative lens, a fourth negative lens, and a fifth positive lens, and the third negative lens includes a concave surface at an object side thereof, and the zoom lens satisfies the following Expressions:

$(D/Z)/fw<0.32$ $(Dt/Z)/fw<1.3$ $0<R1/R2<2.5$, where Dt is an optical overall length of the zoom lens in the telephoto position, Z is a zoom ratio, D is a sum of thicknesses of entire lenses of the first through fourth lens groups, R1 is a radius of curvature of the image side of the second positive lens of the first lens group, R2 is a radius of curvature of the object side of the third negative lens of the second lens group, and fw is a focal length in the wide angle position.

In an embodiment, the zoom lens satisfies the following Expressions:

$nG1>1.9$ $nG5>2.0$, where nG1 is a refractive index of the second negative lens of the first lens group, and nG5 is a refractive index of the fifth positive lens of the second lens group.

In an embodiment, the zoom lens satisfies the following Expressions:

$L/ft<0.7$ $f1/fw<6.0$ $f1/ft<0.7$, where L is a sum of movement distances of the first through fourth lens groups when zooming is performed from the wide angle position to the telephoto position, ft is a focal length in the telephoto position, f1 is a focal length of the first lens group, and fw is a focal length in the wide angle position.

In an embodiment, the zoom lens satisfies the following Expressions:

$|f2/fw|<1.3$ $f2/ft<0.16$, where f2 is a focal length of the second lens group.

The third lens group may include doublet lenses.

In an embodiment, the zoom lens satisfies the following Expressions:

$D1(w-t)/Z<1.7$ $D2(w-t)/Z<0.15$, where D1(w–t) is a movement distance of the first lens group when zooming is performed from the wide angle position to the telephoto position, and D2(w–t) is a movement distance of the second lens group when zooming is performed from the wide angle position to the telephoto position.

Each of the first through fourth lens groups may include at least one aspherical surface.

In an embodiment, the zoom lens satisfies the following Expressions:

$2.8<Fno\_w<3.5$, where Fno_w is Fno in the wide angle position.

When the zoom lens performs zooming, a distance between the first lens group and the second lens group may increase, a distance between the second lens group and the third lens group may be reduced, and a distance between the third lens group and the fourth lens group may increase.

The fourth lens group may perform focusing according to a variation in a distance from an object.

The fourth lens group may include plastic lenses.

The zoom lens may have an 8× or more and 12× or less zoom ratio.

The first negative lens and the second positive lens may be cemented as doublet lenses.

The third negative lens and the fourth negative lens may be bi-concave lenses.

According to one or more embodiments, an electronic apparatus includes: a zoom lens and an imaging device that receives an image formed by the zoom lens, wherein the zoom lens includes, in an order from an object side to an image side: a first lens group having a positive refractive power; a second lens group having a negative refractive power; a third lens group having a positive refractive power; and a fourth lens group having a positive refractive power, wherein, when zooming is performed from a wide angle position to a telephoto position, the first through fourth lens groups move. Furthermore, in various embodiments, the first lens group includes a first negative lens and a second positive lens from the object side, the second lens group includes a third negative lens, a fourth negative lens, and a fifth positive lens, and the third negative lens includes a concave surface at an object side thereof, and the zoom lens satisfies the following Expressions:

$$(D/Z)/fw < 0.32$$

$$(Dt/Z)/fw < 1.3$$

$$0 < R1/R2 < 2.5,$$

where Dt is an optical overall length of the zoom lens in the telephoto position, Z is a zoom ratio, D is a sum of thicknesses of entire lenses of the first through fourth lens groups, R1 is a radius of curvature of the image side of the second positive lens of the first lens group, R2 is a radius of curvature of the object side of the third negative lens of the second lens group, and fw is a focal length in the wide angle position.

BRIEF DESCRIPTION OF THE DRAWINGS

These and/or other aspects will become apparent and more readily appreciated from the following description of the embodiments, taken in conjunction with the accompanying drawings in which:

FIGS. 2A and 2B are aberration charts for a wide angle position and a telephoto position of the zoom lens of FIG. 1, respectively;

FIGS. 6A and 6B are aberration charts for a wide angle position and a telephoto position of the zoom lens of FIG. 5, respectively;

FIGS. 8A and 8B are aberration charts for a wide angle position and a telephoto position of the zoom lens of FIG. 7, respectively;

FIGS. 12A and 12B are aberration charts for a wide angle position and a telephoto position of the zoom lens of FIG. 11, respectively;

DETAILED DESCRIPTION

Figure 1:
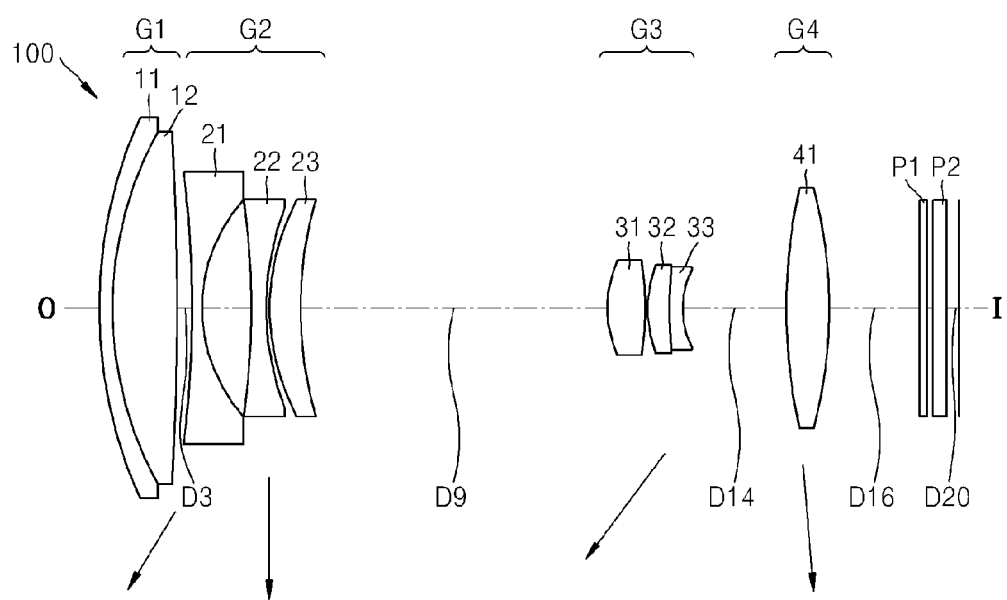
FIG. 1 is a cross-sectional view of a zoom lens according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 illustrates a zoom lens 100 according to an embodiment. The zoom lens 100 includes a first lens group G1 having a positive refractive power, a second lens group G2 having a negative refractive power, a third lens group G3 having a positive refractive power, and a fourth lens group G4 having a positive refractive power. The first through fourth lens groups G1, G2, G3, and G4 are sequentially arranged from an object side O to an image side I of the zoom lens 100, as illustrated in FIG. 1.

When zooming is performed from a wide angle position to a telephoto position, all of the first through fourth lens groups G1, G2, G3, and G4 may be moved. During zooming, a distance between the first lens group G1 and the second lens group G2 may increase, a distance between the second lens group G2 and the third lens group G3 may be reduced, and a distance between the third lens group G3 and the fourth lens group G4 may increase. The fourth lens group G4 may perform focusing according to a variation in a distance from an object.

The first lens group G1 may include a first negative lens 11 and a second positive lens 12 that are sequentially arranged from the object side O. The first negative lens 11 and the second positive lens 12 may be cemented as doublet lenses. The first negative lens 11 may have a meniscus shape in which the first negative lens 11 is convex toward the object side O, for example. The first negative lens 11 may be formed of a material having a high refractive index.

The second lens group G2 may include a third negative lens 21, a fourth negative lens 22, and a fifth positive lens 23. Curvature directions of the image side I of the second positive lens 12 of the first lens group G1 and the object side O of the third negative lens 21 of the second lens group G2 may be the same. Thus, the distance between the first lens group G1 and the second lens group G2 may be reduced in the wide angle position. Also, the third negative lens 21 of the second lens group G2 may be an aspherical lens. Coma and astigmatism caused by rays incident from off axis due to the third negative lens 21 for high magnification and wide angle may be effectively corrected. The third negative lens 21 may have a concave surface at the object side O of the third negative lens 21. For example, the third negative lens 21 and the fourth negative lens 22 may be bi-concave lenses.

The third lens group G3 may include a sixth positive lens 31, a seventh positive lens 32, and an eighth negative lens 33. For example, the sixth positive lens 31 may be a bi-convex lens. The seventh positive lens 32 and the eighth negative lens 33 may be doublet lenses and may have generally positive refractive powers. At least one of the seventh positive lens 31 and the seventh positive lens 32 may be an aspherical lens. Aberration may be corrected using one or more aspherical surfaces even during zooming.

The fourth lens group G4 may include a ninth positive lens 41. The fourth lens group G4 may include one lens. The fourth lens group G4 may perform focusing, and the ninth positive lens 41 may be formed of plastic.

The zoom lens 100 according to the current embodiment may have a small size while realizing a high zoom ratio and reducing an optical overall length of the zoom lens 100 in the telephoto position. Also, the sum of thicknesses of the entire lenses of each lens group may be reduced to reduce the size of the zoom lens when the zoom lens 100 is accommodated in a lens barrel. The image side I of the second positive lens 12 of the first lens group G1 and the object side O of the third negative lens 21 of the second lens group G2 may have the same curvature symbols. Thus, the distance between the first lens group G1 and the second lens group G2 in the wide angle position may be reduced.

The first negative lens 11 of the first lens group G2 may be formed using a high refractive material so that an optical overall length of the zoom lens 100 in the telephoto position may be reduced. The first negative lens 11 may control aberration and may increase a refractive power (may reduce a focal length), thereby reducing the amount of movement of the first lens group G1. Also, a high refractive lens may be used or the thickness of a center of a lens may be minimized within the range of production so as to reduce the sum of thicknesses of the entire lenses of each lens group.

The zoom lens 100 according to the current embodiment may satisfy the following Expressions 1, 2, and 3:

$$(D/Z)/fw < 0.32 \quad (1)$$

$$(Dt/Z)/fw < 1.3 \quad (2)$$

$$0 < R1/R2 < 2.5, \quad (3)$$

where Dt is an optical overall length of the zoom lens 100 in a telephoto position, Z is a zoom ratio, D is the sum of thicknesses of the entire lenses of the first through fourth lens groups G1, G2, G3, and G4, R1 is a radius of curvature of the image side I of the second positive lens 12 of the first lens group G1, R2 is a radius of curvature of the object side O of the third negative lens 21 of the second lens group G2, and fw is a focal length in the wide angle position. The optical overall length of the zoom lens 100 may indicate a distance between a first lens surface to an image plane from the object side O. The image plane may be an image device surface, for example. The zoom ratio represents a ratio of a focal length in the wide angle position with respect to a focal length in the telephoto position.

Expression 1 defines a zoom ratio and an optical overall length of a zoom lens 100 in the telephoto position. When the zoom lens 100 satisfies Expression 1, the size of the lens barrel may be reduced while the zoom ratio is high and the optical overall length of the zoom lens 100 in the telephoto position is minimized.

Expression 2 defines a zoom ratio and the sum of thicknesses of the entire lenses of each lens group. When the zoom lens 100 satisfies Expression 2, the size of the lens barrel may be reduced while the zoom ratio is high and the sum of thicknesses of the entire lenses of each lens group is minimized.

According to Expression 3, the image side I of the second positive lens 12 of the first lens group G1 and the object side O of the second lens group G2 have the same radius of curvature symbols, and when the zoom lens 100 satisfies Expression 3, the distance between the first lens group G1 and the second lens group G2 in the wide angle position may be reduced, and the size of the lens barrel may be reduced.

The zoom lens 100 may satisfy the following Expressions 4 and 5:

$$nG1 > 1.9 \quad (4)$$

$$nG5 > 2.0, \quad (5)$$

where nG1 is a refractive index of a first negative lens of the first lens group G1, and nG5 is a refractive index of a fifth positive lens of the second lens group G2.

When Expressions 4 and 5 are satisfied, aberration may be controlled and the thickness of the center of the lens may be reduced using the high refractive lens among lenses arranged in each lens group.

The zoom lens 100 may satisfy the following Expressions 6, 7, and 8:

$$L/ft < 0.7 \quad (6)$$

$$f1/fw < 6.0 \quad (7)$$

$$f1/ft < 0.7 \quad (8)$$

where L is the sum of movement distances of the first through fourth lens groups G1, G2, G3, and G4 when zooming is performed from the wide angle position to the telephoto position, ft is a focal length in the telephoto position, f1 is a focal length of the first lens group G1, and fw is a focal length in the wide angle position. When (L/ft) satisfies Expression 6, the sum of movement distances of the first through fourth lens groups G1, G2, G3, and G4 may be minimized, and the size of the lens barrel may be reduced. When (f1/fw) and (f1/ft) satisfy Expressions 7 and 8, a focal length of the first lens group G1 may be reduced, a movement distance of the first lens group G1 may be minimized, and the size of the lens barrel may be reduced.

$$|f2/fw| < 1.3 \quad (9)$$

$$f2/ft < 0.16, \quad (10)$$

where f2 is a focal length of the second lens group G2.

When |f2/fw| and (f2/ft) satisfy Expressions 9 and 10, a focal length of the second lens group G2 may be reduced, and a movement distance of the second lens group G2 may be reduced. Thus, the size of the lens barrel may be reduced.

$$D1(w-t)/Z < 1.7 \quad (11)$$

$$D2(w-t)/Z < 0.15, \quad (12)$$

where D1(w–t) is a movement distance of the first lens group G1 when zooming is performed from the wide angle position to the telephoto position, and D2(w–t) is a movement distance of the second lens group G2 when zooming is performed from the wide angle position to the telephoto position. When Expressions 11 and 12 are satisfied, movement distances of the first lens group G1 and the second lens group G2 may be reduced and thus, the size of the barrel may be reduced.

The zooming lens 100 according to the current embodiment may satisfy the following Expression 13:

$$2.8 < Fno\_w < 3.5, \quad (13)$$

where Fno_w is Fno in the wide angle position. The zoom lens 100 according to the current embodiment satisfies Expression 13 so that a bright image may be obtained.

Each of the first through fourth lens groups G1, G2, G3, and G4 may include at least one aspherical lens.

An aspherical surface in the current embodiment is defined as below.

When an optical axis direction is an x-axis, a direction perpendicular to the optical axis direction is a y-axis and a ray progression direction is positive, an aspherical shape of the zoom lens 100 according to the current embodiment may be indicated by the following Expression 14. Here, x is a distance from a vertex of a lens in the optical axis direction, y is a distance in the direction perpendicular to the optical axis direction, K is a conic constant, A, B, C, and D are aspherical coefficients, and c is a reciprocal (1/R) of a radius of curvature at the vertex of the lens.

$$x = \frac{cy^2}{1 + \sqrt{1 - (K+1)c^2 y^2}} + Ay^4 + By^6 + Cy^8 + Dy^{10} \quad (14)$$

A zoom lens having a small size and a high zoom ratio may be realized in embodiments of various designs that will be described below.

Hereinafter, design data of a zoom lens according to first through eighth embodiments will be described. Hereinafter, "EFL" is the entire focal length in units of mm, Fno is an F-number, ANG is a half field of view (FOV) in units of degrees, OAL is an overall length of the zoom lens, BFL is a back focal length, Dn is a distance between lenses and a lens thickness, nd is a refractive index, vd is an Abbe's number, Img is an image plane, and * is an aspherical surface. In the drawings of the embodiments, at least one of filters P1 and P2 may be provided at an uppermost part of the image side I.

The filters P1 and P2 may include at least one of a lowpass filter and an infrared (IR)-cut filter. However, the zoom lens may be configured without a filter. In the following tables, the number of surfaces is sequentially numbered from the object side O to the image side I in a line.

FIGS. 3, 5, 7, 9, 11, 13, and 15 show lenses, lens groups, and other structures that will be referred to using the same reference numbers, grouping designations, and other labels used in conjunction with FIG. 1. The lens data for each embodiment will vary, however, and example sets of lens data will be described for each figure. The distances D3, D9, D14, D16, and D20 noted in the following tables correspond to similarly-labeled dimensions in the figures.

Embodiment 1

FIG. 1 illustrates a zoom lens according to a first embodiment. The following table 1 shows design data of the zoom lens of FIG. 1 in an embodiment.

TABLE 1

| Number of lens surface | Radius of curvature | Thickness | nd | vd |
|---|---|---|---|---|
| 1 | 17.82 | 0.50 | 1.92286 | 20.88 |
| 2 | 13.867 | 2.55 | 1.61738 | 63.71 |
| 3* | −101.63 | D3 | | |
| 4 | −43.37 | 0.40 | 1.8061 | 40.73 |
| 5 | 6.00 | 1.94 | | |
| 6* | −310.76 | 0.57 | 1.5139 | 63.76 |
| 7* | 8.82 | 0.10 | | |
| 8 | 8.55 | 1.24 | 2.1042 | 17.02 |
| 9 | 15.14 | D9 | | |
| 10* | 4.43 | 1.47 | 1.589 | 61.05 |
| 11* | −13.46 | 0.10 | | |
| 12 | 5.28 | 0.88 | 1.6258 | 35.74 |
| 13 | 25.3 | 0.42 | 1.805 | 25.46 |
| 14 | 3.17 | D14 | | |
| 15* | 32.38 | 1.63 | 1.5312 | 56.51 |
| 16* | −13.57 | D16 | | |
| 17 | ∞ | 0.21 | 1.5168 | 64.20 |
| 18 | ∞ | 0.3 | | |
| 19 | ∞ | 0.5 | 1.5168 | 64.20 |
| 20 | ∞ | D20 | | |
| 21 | ∞ | | | |

The following table 2 shows data of aspherical coefficients of the zoom lens of FIG. 1 in an embodiment.

TABLE 2

| Number of lens surface | K | A | B | C | D |
|---|---|---|---|---|---|
| 4 | 0 | 1.32E−05 | 5.12E−08 | −9.26E−10 | 0.00E+00 |
| 6 | 10 | −2.22E−03 | 1.27E−04 | −3.67E−06 | 8.16E−08 |
| 7 | 0.595736 | −2.55E−03 | 1.51E−04 | −4.69E−06 | 9.85E−08 |
| 10 | −0.60188 | −3.28E−04 | −2.71E−05 | 1.97E−05 | −2.19E−06 |
| 11 | −9.70184 | 3.14E−04 | −2.24E−05 | 2.32E−05 | −2.90E−06 |
| 15 | 8.609525 | 1.44E−03 | −1.58E−04 | 9.42E−06 | −2.07E−07 |
| 16 | −9.77086 | 1.77E−03 | −2.25E−04 | 1.27E−05 | −2.66E−07 |

The following table 3 shows data of a variable distance during zooming in an embodiment.

TABLE 3

| Variable distance | Wide angle position | Normal position | Telephoto position |
|---|---|---|---|
| D3 | 0.541 | 6.00 | 12.84 |
| D9 | 11.90 | 5.30 | 0.50 |
| D14 | 4.08 | 11.0 | 17.70 |
| D16 | 3.57 | 3.13 | 2.44 |
| D20 | 0.53 | 0.541 | 0.536 |

The following table 4 shows data of the zoom lens of FIG. 1 in an embodiment.

TABLE 4

|  | Wide angle position | Normal position | Telephoto position |
| --- | --- | --- | --- |
| EFL | 4.84 | 13.66 | 41.68 |
| FNo | 2.80 | 4.26 | 5.77 |
| OAL | 33.41 | 38.80 | 46.83 |
| ANG | 41.185 | 16.32 | 5.48 |
| BFL (in air) | 4.840 | 4.439 | 3.741 |

FIGS. 2A and 2B show longitudinal spherical aberration, astigmatic field curves, and distortion in a wide angle position and a telephoto position of the zoom lens of FIG. 1, respectively, according to an embodiment. Astigmatic field curves include tangential field curvature (T) and sagittal field curvature (S).

Embodiment 2

Figure 3:
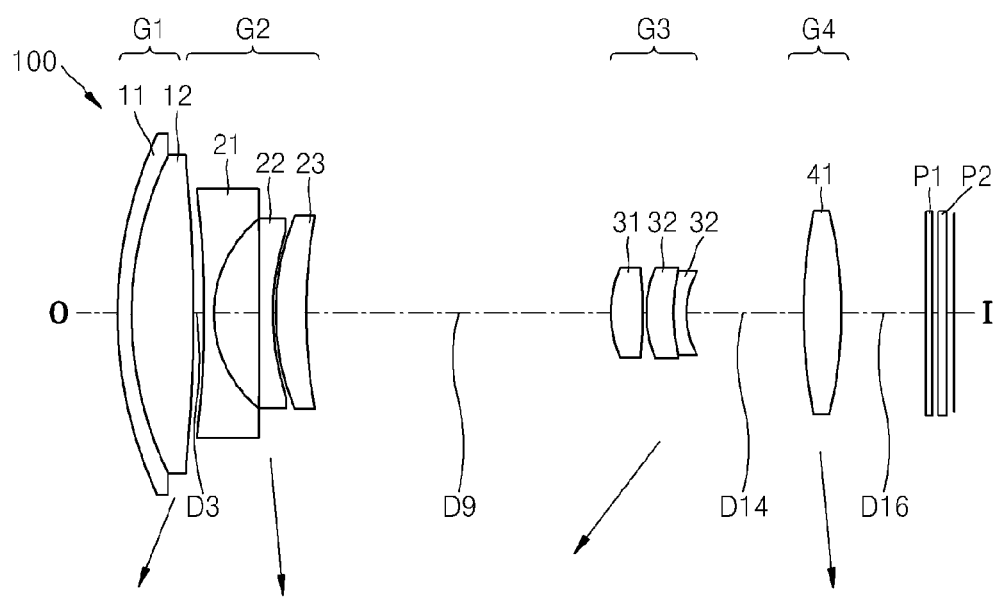
FIG. 3 is a cross-sectional view of a zoom lens according to another embodiment.

FIG. 3 illustrates a zoom lens according to a second embodiment. The following table 5 shows design data of the zoom lens of FIG. 3 in an embodiment.

TABLE 5

| Number of lens surface | Radius of curvature | Thickness | nd | vd |
| --- | --- | --- | --- | --- |
| 1 | 17.47 | 0.50 | 1.9650826 | 18.75 |
| 2 | 14.40 | 2.45 | 1.5928244 | 68.62 |
| 3* | −81.18 | D3 | | |
| 4 | −40.59 | 0.40 | 1.7853308 | 41.57 |
| 5* | 5.471 | 1.8236 | | |
| 6* | 62.84 | 0.60 | 1.5312001 | 56.5 |
| 7* | 8.244 | 0.13 | | |
| 8 | 10.656 | 1.20 | 2.1042006 | 17.0 |
| 9 | 25.630 | D9 | | |
| 10* | 4.88 | 1.32 | 1.5891301 | 61.24 |
| 11* | −13.490 | 0.1 | | |
| 12 | 5.315 | 1.15 | 1.4969971 | 81.61 |
| 13 | 10.07 | 0.46 | 1.7847003 | 26.30 |
| 14 | 3.280 | D14 | | |
| 15* | 27.25 | 1.65 | 1.5312001 | 56.51 |
| 16* | −14.44 | D16 | | |
| 17 | ∞ | 0.21 | 1.5168 | 64.20 |
| 18 | ∞ | 0.30 | | |
| 19 | ∞ | 0.30 | 1.5168 | 64.20 |
| 20 | ∞ | D20 | | |
| 21 | ∞ | | | |

The following table 6 shows aspherical lens coefficients in an embodiment.

TABLE 6

| Number of lens surface | K | A | B | C | D |
| --- | --- | --- | --- | --- | --- |
| 3 | −4.96168 | 1.49E−05 | 2.48E−07 | −9.48E−09 | 1.07E−10 |
| 5 | −0.34127 | 6.99E−04 | 6.03E−05 | 4.20E−06 | −1.99E−07 |
| 6 | 10 | −1.23E−03 | 2.27E−04 | −1.23E−05 | 1.28E−07 |
| 7 | 0.144578 | −2.39E−03 | 1.64E−04 | −1.30E−05 | 2.55E−07 |
| 10 | −0.6742 | −3.85E−04 | 2.65E−06 | −4.76E−06 | −4.32E−07 |
| 11 | −0.87862 | 4.33E−04 | 3.20E−06 | −7.13E−06 | −3.05E−07 |
| 15 | 9.960815 | 1.63E−03 | −1.83E−04 | 9.81E−06 | −2.16E−07 |
| 16 | −2.60425 | 2.46E−03 | −2.66E−04 | 1.31E−05 | −2.64E−07 |

The following table 7 shows a variable distance during zooming of the zoom lens of FIG. 3 in an embodiment.

TABLE 7

| Variable distance | Wide angle position | Normal position | Telephoto position |
| --- | --- | --- | --- |
| D3 | 0.511 | 7.263 | 12.614 |
| D9 | 12.404 | 4.889 | 0.5 |
| D14 | 4.686 | 12.826 | 18.00 |
| D16 | 3.46 | 2.57 | 2.17 |
| D20 | 0.364 | 0.396 | 0.516 |

The following table 8 shows lens data of the zoom lens of FIG. 3 in an embodiment.

TABLE 8

|  | Wide angle position | Normal position | Telephoto position |
| --- | --- | --- | --- |
| EFL | 4.87 | 16.56 | 41.93 |
| FNo | 3.17 | 5.08 | 6.43 |
| OAL | 33.99 | 40.55 | 46.41 |
| ANG | 40.37 | 13.35 | 5.35 |
| BFL (in air) | 4.44 | 3.61 | 3.34 |

Figure 4A:
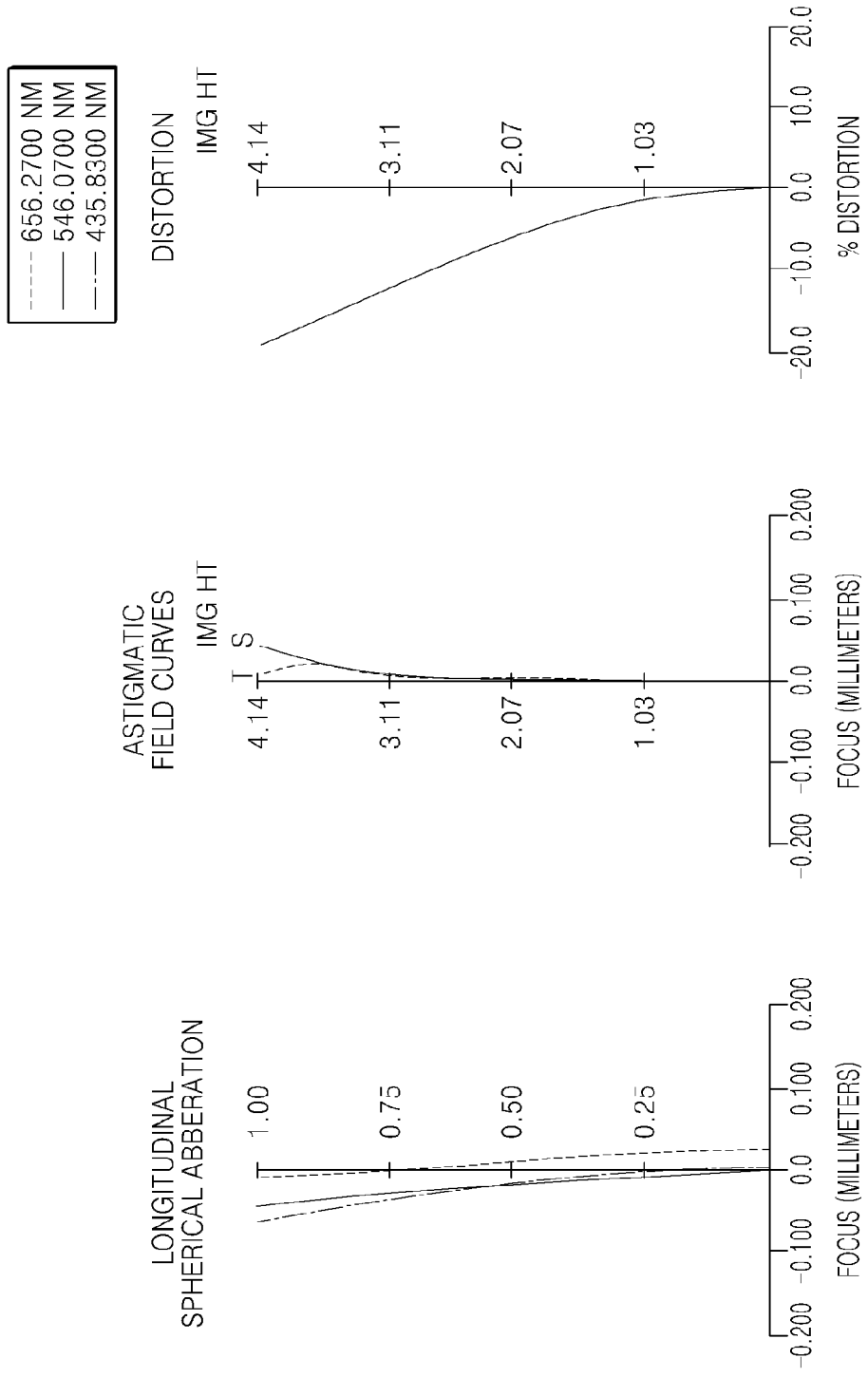
FIGS. 4A and 4B are aberration charts for a wide angle position and a telephoto position of the zoom lens of FIG. 3, respectively.
Figure 4B:
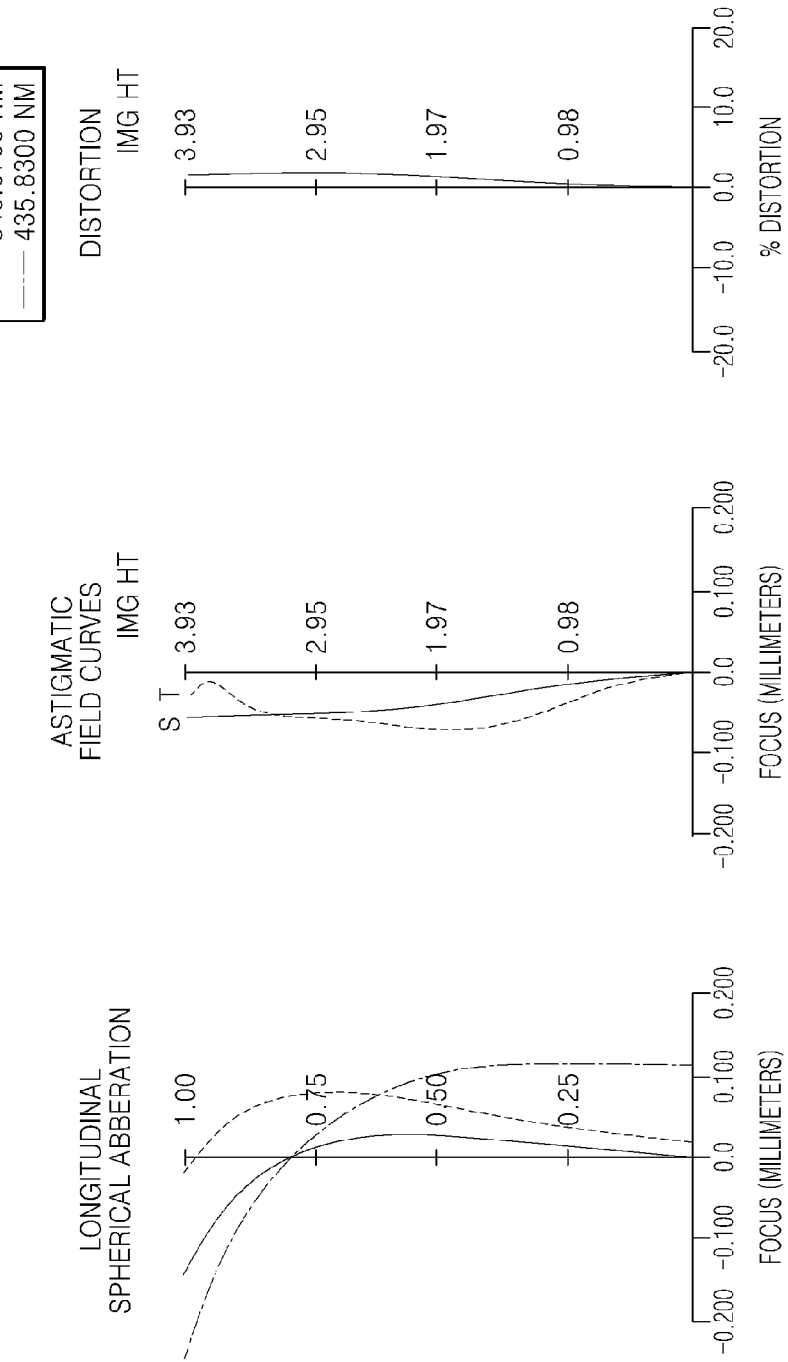

FIGS. 4A and 4B show longitudinal spherical aberration, astigmatic field curves, and distortion in a wide angle position and a telephoto position of the zoom lens of FIG. 3, respectively, in an embodiment.

Embodiment 3

Figure 5:
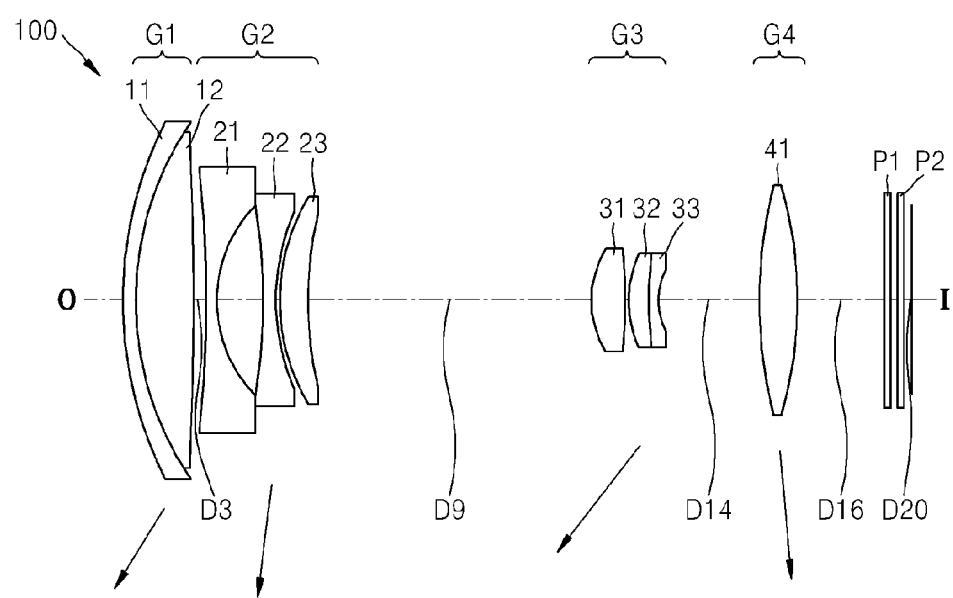
FIG. 5 is a cross-sectional view of a zoom lens according to another embodiment.

FIG. 5 illustrates a zoom lens according to a third embodiment, and the following table 9 shows design data of the zoom lens of FIG. 5 in an embodiment.

TABLE 9

| Number of lens surface | Radius of curvature | Thickness | nd | vd |
| --- | --- | --- | --- | --- |
| 1 | 17.746 | 0.50 | 1.92286 | 20.88 |
| 2 | 13.836 | 2.543 | 1.61738 | 63.71 |
| 3* | −103.441 | D3 | | |
| 4 | −43.249 | 0.4 | 1.8061 | 40.73 |
| 5 | 6.059 | 1.926 | | |
| 6* | −310.767 | 0.633 | 1.5147 | 63.78 |
| 7* | 8.766 | 0.1 | | |
| 8 | 8.749 | 1.228 | 2.1042 | 17.02 |
| 9 | 15.822 | D9 | | |
| 10* | 4.431 | 1.446 | 1.589 | 61.05 |
| 11* | −13.471 | 0.1 | | |
| 12 | 5.324 | 0.875 | 1.6258 | 35.74 |
| 13 | 24.856 | 0.425 | 1.80518 | 25.46 |
| 14 | 3.175 | D14 | | |

TABLE 9-continued

| Number of lens surface | Radius of curvature | Thickness | nd | vd |
|---|---|---|---|---|
| 15* | 32.378 | 0.63 | 1.5312 | 56.51 |
| 16* | −13.505 | D16 | | |
| 17 | ∞ | 0.21 | 1.5168 | 64.20 |
| 18 | ∞ | 0.3 | | |
| 19 | ∞ | 0.3 | 1.5168 | 64.20 |
| 20 | ∞ | D20 | | |
| 21 | ∞ | | | |

The following table 10 shows aspherical lens coefficients in an embodiment.

TABLE 10

| Number of lens surface | K | A | B | C | D |
|---|---|---|---|---|---|
| 3 | 0 | 1.33E−05 | 4.39E−08 | −7.91E−10 | 0.00E+00 |
| 6 | −10 | −2.21E−03 | 1.23E−04 | −3.20E−06 | 6.23E−08 |
| 7 | 0.528216 | −2.55E−03 | 1.48E−04 | −4.32E−06 | 7.96E−08 |
| 10 | −0.61753 | −3.58E−04 | −1.08E−05 | 9.54E−06 | −9.58E−07 |
| 11 | −10 | 2.26E−04 | −1.46E−06 | 9.28E−06 | −9.93E−07 |
| 15 | 7.144489 | 1.36E−03 | −1.34E−04 | 7.83E−06 | −1.64E−07 |
| 16 | −3.05269 | 2.01E−03 | −2.09E−04 | 1.13E−05 | −2.26E−07 |

The following table 11 shows a variable distance during zooming of the zoom lens of FIG. 5 in an embodiment.

TABLE 11

| Variable distance | Wide angle position | Normal position | Telephoto position |
|---|---|---|---|
| D3 | 0.542 | 5.844 | 12.764 |
| D9 | 12.172 | 5.178 | 0.50 |
| D14 | 4.271 | 11.551 | 17.803 |
| D16 | 3.781 | 3.057 | 2.685 |
| D20 | 0.363 | 0.735 | 0.415 |

The following table 12 shows lens data of the zoom lens of FIG. 5 in an embodiment.

TABLE 12

| | Wide angle position | Normal position | Telephoto position |
|---|---|---|---|
| EFL | 4.84 | 14.04 | 41.6245 |
| FNo | 3.42 | 5.2 | 6.97 |
| OAL | 33.73 | 38.999 | 46.7785 |
| ANG | 40.5425 | 15.6411 | 5.3936 |
| BFL (in air) | 4.7562 | 4.4379 | 3.7229 |

Figure 6A:
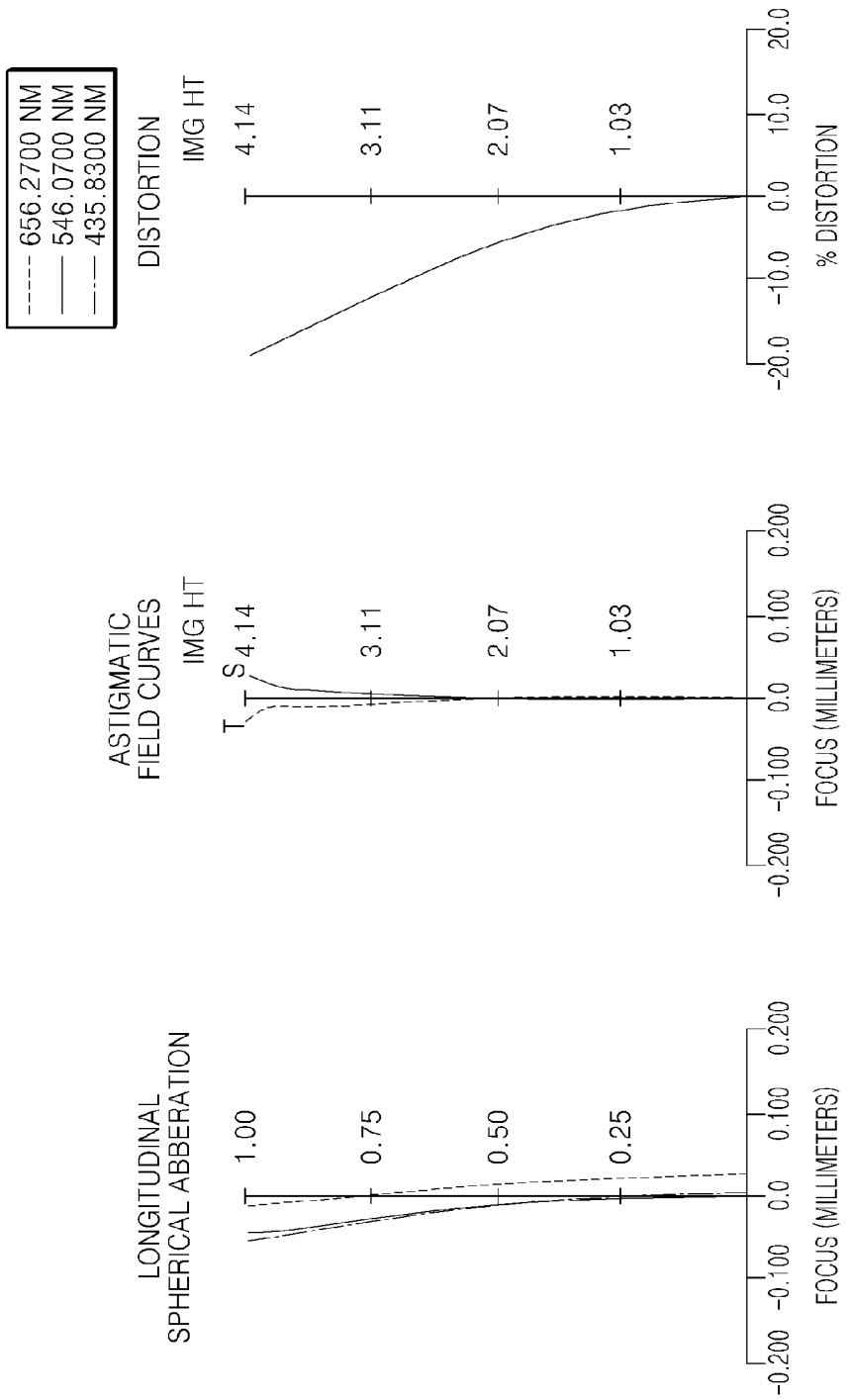

FIGS. 6A and 6B show longitudinal spherical aberration, astigmatic field curves, and distortion in a wide angle position and a telephoto position of the zoom lens of FIG. 5, respectively, in an embodiment.

Embodiment 4

Figure 7:
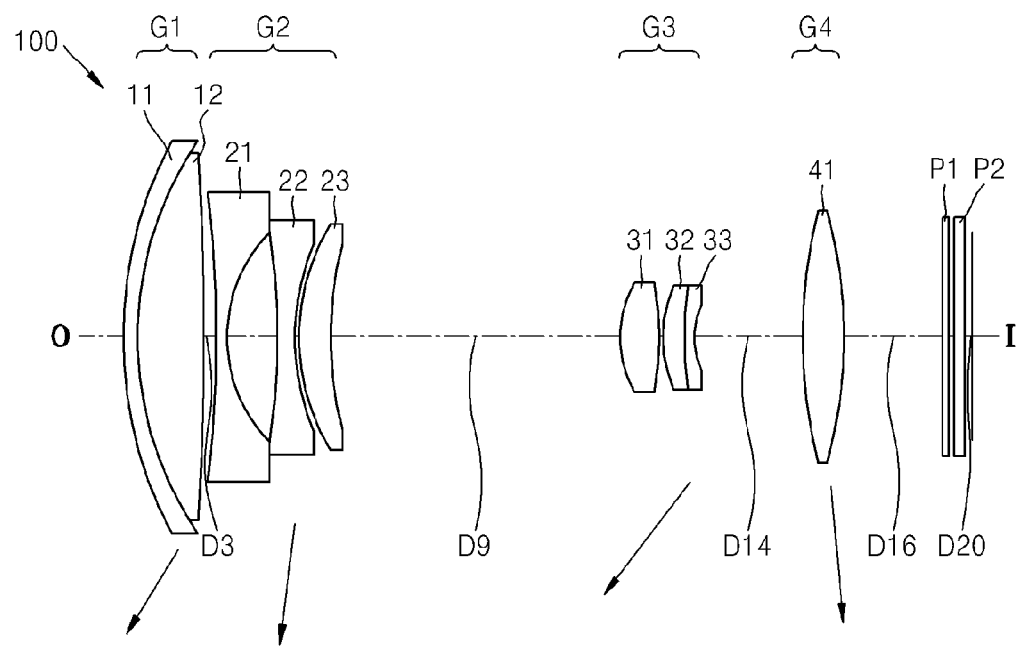
FIG. 7 is a cross-sectional view of a zoom lens according to another embodiment.

FIG. 7 illustrates a zoom lens according to a fourth embodiment, and the following table 13 shows design data of the zoom lens of FIG. 7 in an embodiment.

TABLE 13

| Number of lens surface | Radius of curvature | Thickness | nd | vd |
|---|---|---|---|---|
| 1 | 17.8461 | 0.5 | 1.92286 | 20.88 |
| 2 | 13.949 | 2.545 | 1.61738 | 63.71 |

TABLE 13-continued

| Number of lens surface | Radius of curvature | Thickness | nd | vd |
|---|---|---|---|---|
| 3* | −99.7134 | D3 | | |
| 4 | −43.3514 | 0.4 | 1.8061 | 40.73 |
| 5 | 6.0043 | 1.9669 | | |
| 6* | −310.7674 | 0.665 | 1.5147 | 63.78 |
| 7* | 8.1467 | 0.1268 | | |
| 8 | 8.6076 | 1.2414 | 2.1042 | 17.02 |
| 9 | 15.4541 | D9 | | |
| 10* | 4.4322 | 1.5227 | 1.589 | 61.05 |
| 11* | −13.0055 | 0.1 | | |
| 12 | 5.1294 | 0.9085 | 1.6258 | 35.74 |
| 13 | 31.1326 | 0.35 | 1.805 | 25.45 |
| 14 | 3.1597 | D14 | | |
| 15* | 32.3776 | 1.6262 | 1.5312 | 56.51 |
| 16* | −13.4583 | D16 | | |
| 17 | ∞ | 0.21 | 1.5168 | 64.20 |
| 18 | ∞ | 0.3 | | |
| 19 | ∞ | 0.3 | 1.5168 | 64.20 |
| 20 | ∞ | D20 | | |
| 21 | ∞ | | | |

The following table 14 shows aspherical lens coefficients in an embodiment.

TABLE 14

| Number of lens surface | K | A | B | C | D |
|---|---|---|---|---|---|
| 3 | 0.000000 | 1.402554e−005 | 1.761556e−008 | −3.487926e−010 | 0.000000e+000 |
| 6 | 10.000000 | −2.435423e−003 | 1.269030e−004 | −2.794280e−006 | 5.319258e−008 |
| 7 | 0.063572 | −2.719070e−003 | 1.570501e−004 | −3.903173e−006 | 7.107598e−008 |
| 10 | −0.606242 | −3.409641e−004 | −8.816088e−006 | 1.344603e−005 | −1.431939e−006 |

TABLE 14-continued

| Number of lens surface | K | A | B | C | D |
|---|---|---|---|---|---|
| 11 | −0.970891 | 1.317335e−003 | 1.192219e−005 | 1.175877e−005 | −1.403800e−006 |
| 15 | 8.609525 | 1.444215e−003 | −1.380101e−004 | 8.099465e−006 | −1.696191e−007 |
| 16 | −2.516632 | 1.951943e−003 | −2.095421e−004 | 1.126549e−005 | −2.247782e−007 |

The following table 15 shows a variable distance during zooming of the zoom lens of FIG. 7 in an embodiment.

TABLE 15

| Variable distance | Wide angle position | Normal position | Telephoto position |
|---|---|---|---|
| D3 | 0.535 | 5.827 | 13.127 |
| D9 | 11.324 | 4.894 | 0.50 |
| D14 | 4.268 | 11.822 | 17.306 |
| D16 | 3.781 | 3.057 | 2.685 |
| D20 | 0.345 | 0.623 | 0.417 |

The following table 16 shows lens data of the zoom lens of FIG. 7 in an embodiment.

TABLE 16

| | Wide angle position | Normal position | Telephoto position |
|---|---|---|---|
| EFL | 4.84 | 14.0318 | 41.6286 |
| FNo | 3.4 | 5.3 | 6.83 |
| OAL | 33.0 | 39.0 | 46.79 |
| ANG | 40.54 | 15.65 | 5.39 |
| BFL (in air) | 4.74 | 4.32 | 3.73 |

Figure 8B:
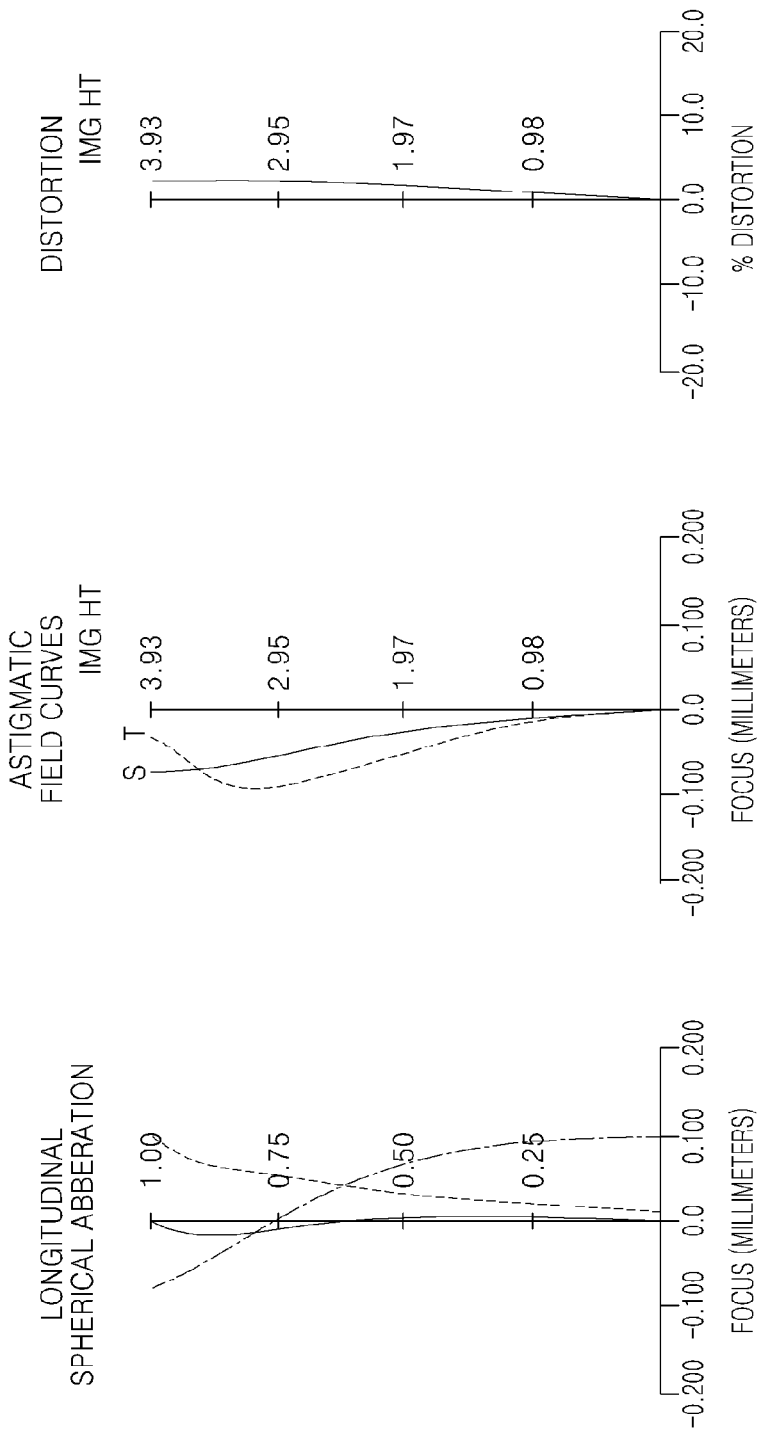

FIGS. 8A and 8B show longitudinal spherical aberration, astigmatic field curves, and distortion in a wide angle position and a telephoto position of the zoom lens of FIG. 7, respectively, in an embodiment.

Embodiment 5

Figure 9:
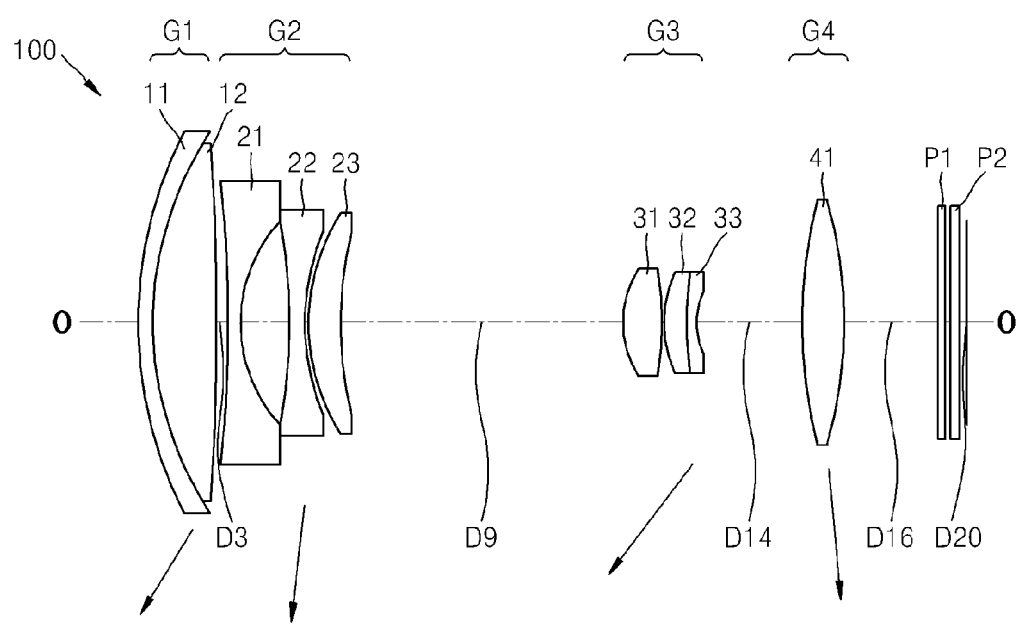
FIG. 9 is a cross-sectional view of a zoom lens according to another embodiment.

FIG. 9 illustrates a zoom lens according to a fifth embodiment, and the following table 17 shows design data of the zoom lens of FIG. 9 in an embodiment.

TABLE 17

| Number of lens surface | Radius of curvature | Thickness | nd | vd |
|---|---|---|---|---|
| 1 | 17.7061 | 0.5 | 1.92286 | 20.88 |
| 2 | 13.851 | 2.47 | 1.61738 | 63.71 |
| 3* | −100.6428 | D3 | | |

TABLE 17-continued

| Number of lens surface | Radius of curvature | Thickness | nd | vd |
|---|---|---|---|---|
| 4 | −43.7744 | 0.3948 | 1.8061 | 40.73 |
| 5 | 5.9833 | 1.9676 | | |
| 6* | −310.7674 | 0.5962 | 1.5147 | 63.78 |
| 7* | 8.1389 | 0.1601 | | |
| 8 | 8.3673 | 1.258 | 2.1042 | 17.02 |
| 9 | 14.587 | D9 | | |
| 10* | 4.4267 | 1.4628 | 1.589 | 61.05 |
| 11* | −13.0662 | 0.1 | | |
| 12 | 5.1827 | 0.9174 | 1.6258 | 35.74 |
| 13 | 30.3011 | 0.35 | 1.805 | 25.45 |
| 14 | 3.1673 | D14 | | |
| 15* | 32.3776 | 1.6189 | 1.5312 | 56.51 |
| 16* | −13.5041 | D16 | | |
| 17 | ∞ | 0.21 | 1.5168 | 64.20 |
| 18 | ∞ | 0.3 | | |
| 19 | ∞ | 0.5 | 1.5168 | 64.20 |
| 20 | ∞ | D20 | | |
| 21 | ∞ | | | |

The following table 18 shows aspherical lens coefficients in an embodiment.

TABLE 18

| Number of lens surface | K | A | B | C | D |
|---|---|---|---|---|---|
| 3 | 0.000000 | 1.418705e−005 | 2.127073e−008 | −4.671336e−010 | 0.000000e+000 |
| 6 | −10.000000 | −2.397155e−003 | 1.280435e−004 | −2.730769e−006 | 5.390368e−008 |
| 7 | 0.186565 | −2.681391e−003 | 1.575167e−004 | −3.859581e−006 | 7.495292e−008 |
| 10 | −0.605858 | −3.401302e−004 | −9.574190e−006 | 1.353175e−005 | −1.273953e−006 |
| 11 | −9.946736 | 2.413661e−004 | 1.190952e−005 | 1.200669e−005 | −1.276523e−006 |
| 15 | −0.879655 | 1.316549e−003 | −1.379290e−004 | 8.068762e−006 | −1.692232e−007 |
| 16 | −2.854375 | 1.961353e−003 | −2.101189e−004 | 1.128515e−005 | −2.254410e−007 |

The following table 19 shows data regarding a variable distance during zooming in an embodiment.

TABLE 19

| Variable distance | Wide angle position | Normal position | Telephoto position |
|---|---|---|---|
| D3 | 0.535 | 5.278 | 13.15 |
| D9 | 11.521 | 4.914 | 0.5 |
| D14 | 4.498 | 12.524 | 17.677 |
| D16 | 3.781 | 3.057 | 2.685 |
| D20 | 0.273 | 0.605 | 0.413 |

The following table 20 shows lens data of the zoom lens of FIG. 9 in an embodiment.

TABLE 20

|  | Wide angle position | Normal position | Telephoto position |
|---|---|---|---|
| EFL | 4.84 | 14.03 | 42.60 |
| FNo | 3.41 | 5.33 | 6.814 |
| OAL | 33.2 | 39.0 | 47.03 |
| ANG | 40.5415 | 15.6509 | 5.2715 |
| BFL (in air) | 4.6643 | 4.3076 | 3.7263 |

Figure 10A:
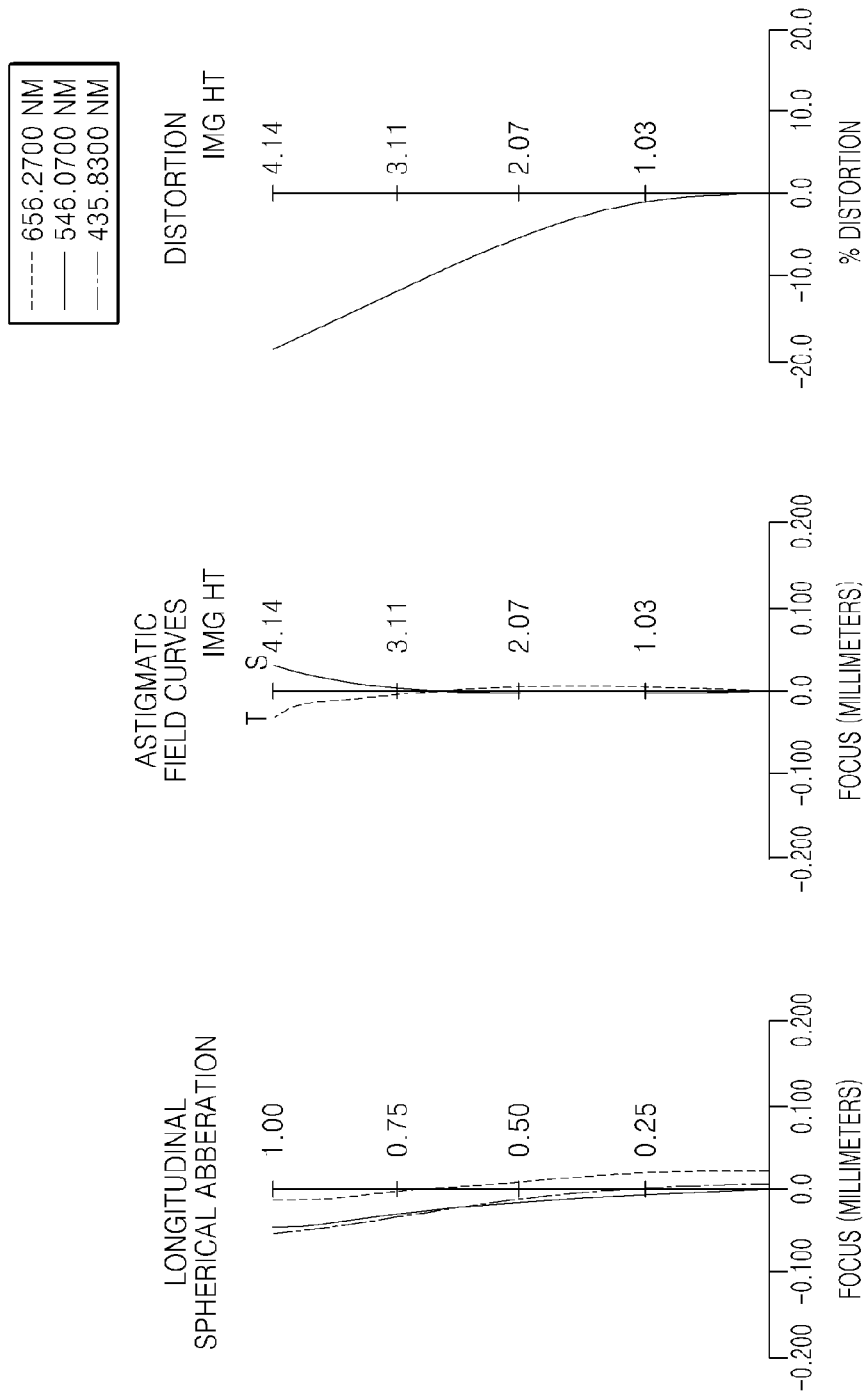
FIGS. 10A and 10B are aberration charts for a wide angle position and a telephoto position of the zoom lens of FIG. 9, respectively.
Figure 10B:
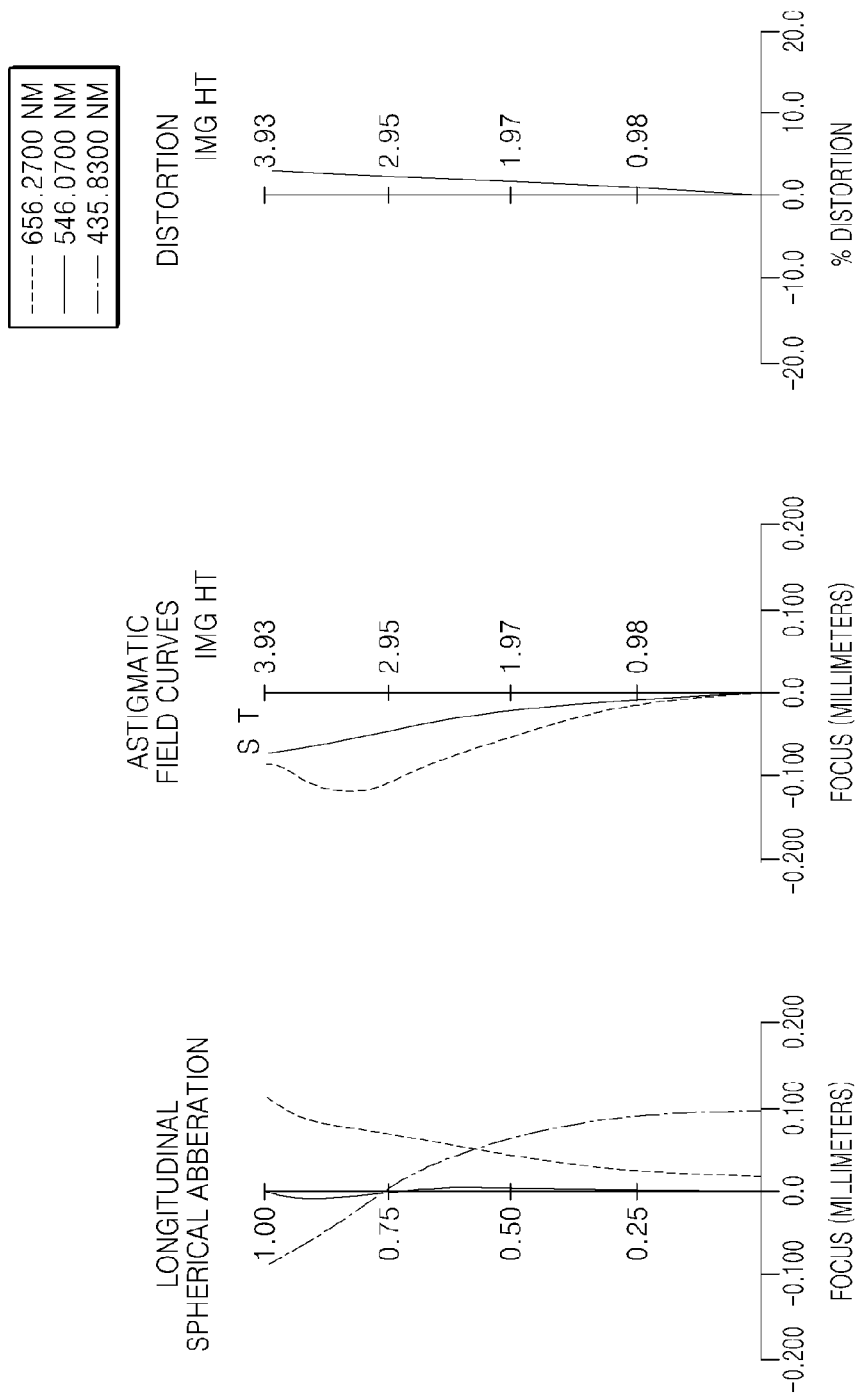

FIGS. 10A and 10B show longitudinal spherical aberration, astigmatic field curves, and distortion in a wide angle position and a telephoto position of the zoom lens of FIG. 9, respectively, according to an embodiment. Astigmatism curves include tangential field curvature (T) and sagittal field curvature (S).

Embodiment 6

Figure 11:
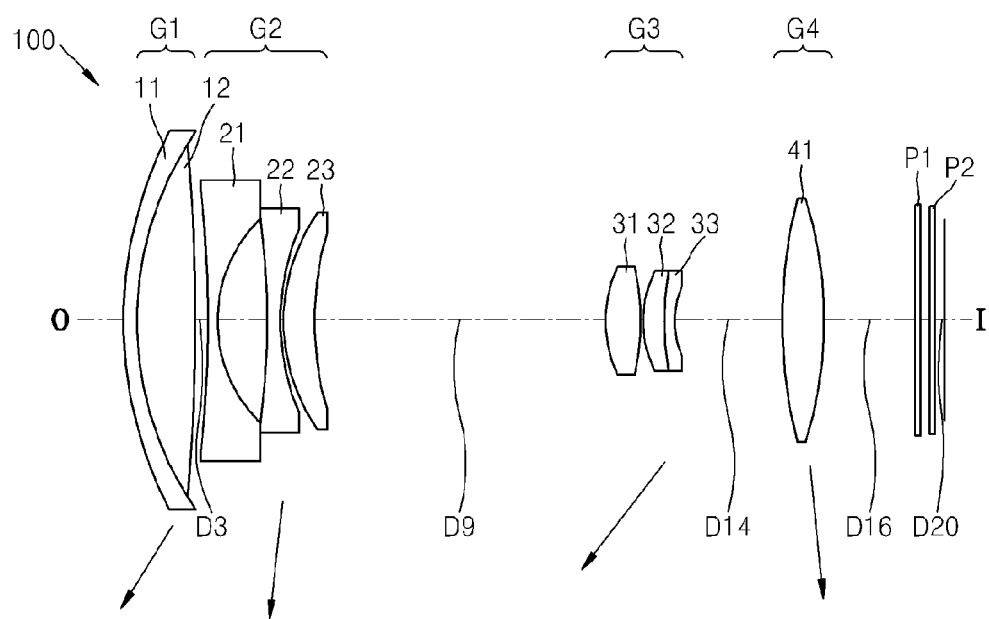
FIG. 11 is a cross-sectional view of a zoom lens according to another embodiment.

FIG. 11 illustrates a zoom lens according to a sixth embodiment, and the following table 21 shows design data of the zoom lens of FIG. 11 in an embodiment.

TABLE 21

| Number of lens surface | Radius of curvature | Thickness | nd | vd |
|---|---|---|---|---|
| 1 | 17.7182 | 0.5 | 1.92286 | 20.88 |
| 2 | 13.7768 | 2.3651 | 1.61738 | 63.71 |
| 3* | −91.2728 | D3 |  |  |
| 4 | −44.2167 | 0.4 | 1.8061 | 40.73 |
| 5 | 5.9914 | 1.9629 |  |  |
| 6* | −310.7674 | 0.5833 | 1.5147 | 63.78 |
| 7* | 8.2957 | 0.1 |  |  |
| 8 | 7.9309 | 1.2708 | 2.1042 | 17.02 |
| 9 | 13.193 | D9 |  |  |
| 10* | 4.3999 | 1.4401 | 1.589 | 61.05 |
| 11* | −13.5025 | 0.1 |  |  |
| 12 | 5.1433 | 0.8903 | 1.6258 | 35.74 |
| 13 | 23.0818 | 0.35 | 1.805 | 25.45 |
| 14 | 3.1431 | D14 |  |  |
| 15* | 32.3776 | 1.6137 | 1.5312 | 56.51 |
| 16* | −13.7628 | D16 |  |  |
| 17 | ∞ | 0.21 | 1.5168 | 64.20 |
| 18 | ∞ | 0.3 |  |  |
| 19 | ∞ | 0.3 | 1.5168 | 64.20 |
| 20 | ∞ | D20 |  |  |
| 21 | ∞ |  |  |  |

The following table 22 shows data regarding aspherical coefficients of the zoom lens of FIG. 11 in an embodiment.

TABLE 22

| Number of lens surface | K | A | B | C | D |
|---|---|---|---|---|---|
| 3 | 0.000000 | 1.521287e−005 | 1.373912e−008 | −4.253255e−010 | 0.000000e+000 |
| 6 | 10.000000 | −2.336259e−003 | 1.298976e−004 | −2.775527e−006 | 4.342168e−008 |
| 7 | 0.436746 | −2.600253e−003 | 1.584745e−006 | −3.895710e−006 | 6.347384e−008 |
| 10 | −0.608667 | −3.443648e−004 | −1.122422e−005 | 1.326415e−005 | −1.285796e−006 |
| 11 | −9.947756 | 2.571124e−004 | 8.147455e−006 | 1.094288e−005 | −1.031130e−006 |
| 15 | −0.871209 | 1.313530e−003 | −1.385977e−004 | 8.107026e−006 | −1.688482e−007 |
| 16 | −2.342780 | 1.948952e−003 | −2.103154e−004 | 1.134154e−005 | −2.256293e−007 |

The following table 23 shows a variable distance during zooming of the zoom lens of FIG. 11 in an embodiment.

TABLE 23

| Variable distance | Wide angle position | Normal position | Telephoto position |
|---|---|---|---|
| D3 | 0.538 | 5.561 | 12.988 |
| D9 | 11.747 | 5.121 | 0.500 |
| D14 | 4.42 | 12.091 | 17.971 |
| D16 | 3.781 | 3.057 | 2.685 |
| D20 | 0.385 | 0.761 | 0.411 |

The following table 24 shows lens data of the zoom lens of FIG. 11 in an embodiment.

TABLE 24

|  | Wide angle position | Normal position | Telephoto position |
|---|---|---|---|
| EFL | 4.84 | 14.0347 | 43.5602 |
| FNo | 3.45 | 5.5 | 6.9 |
| OAL | 33.24 | 38.9951 | 46.9447 |
| ANG | 40.5434 | 15.6434 | 5.1553 |
| BFL (in air) | 4.7771 | 4.462 | 3.725 |

Figure 12A:
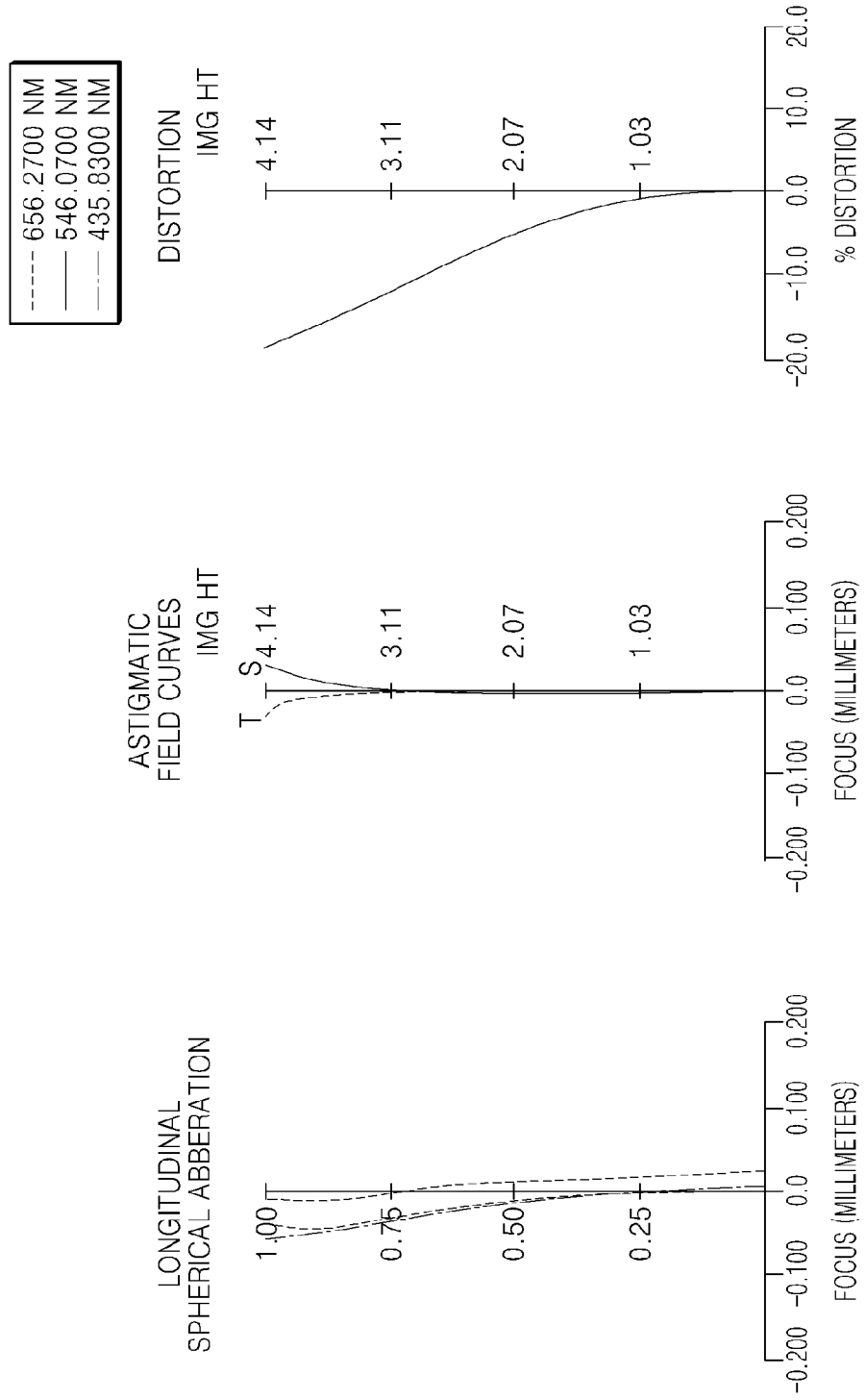

FIGS. 12A and 12B show longitudinal spherical aberration, astigmatic field curves, and distortion in a wide angle position and a telephoto position of the zoom lens of FIG. 11, respectively, according to an embodiment.

Embodiment 7

Figure 13:
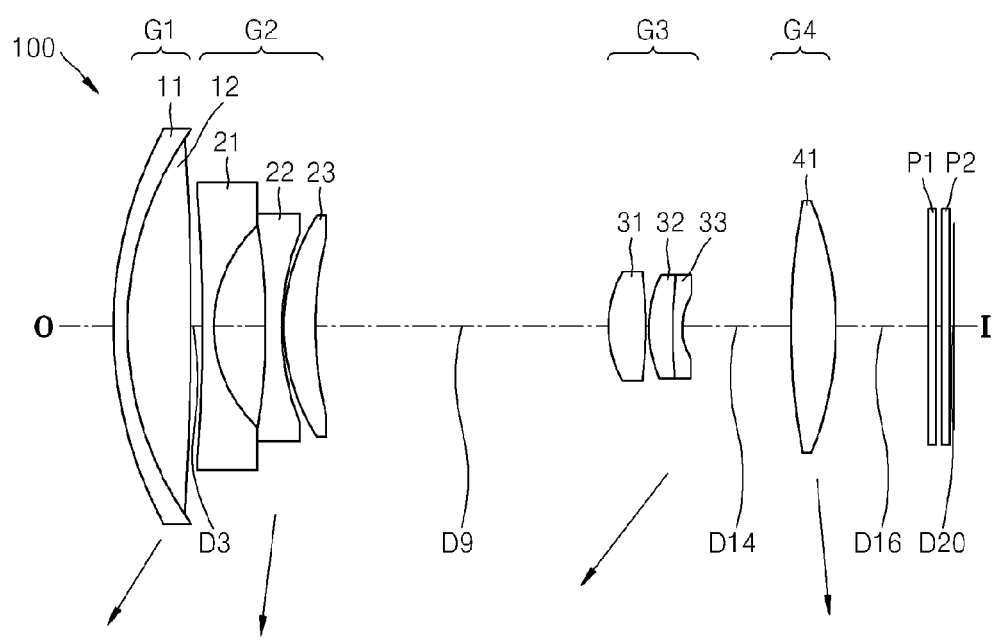
FIG. 13 is a cross-sectional view of a zoom lens according to another embodiment.

FIG. 13 illustrates a zoom lens according to a seventh embodiment, and the following equation 25 shows design data of the zoom lens of FIG. 13 in an embodiment.

TABLE 25

| Number of lens surface | Radius of curvature | Thickness | nd | vd |
|---|---|---|---|---|
| 1 | 16.7934 | 0.5081 | 1.92286 | 20.88 |
| 2 | 13.214 | 2.5369 | 1.61738 | 63.71 |
| 3* | −129.7838 | D3 |  |  |
| 4 | −56.4057 | 0.4 | 1.8061 | 40.73 |
| 5 | 5.5438 | 2.0524 |  |  |
| 6* | −310.7674 | 0.6216 | 1.5147 | 63.78 |
| 7* | 8.2717 | 0.1002 |  |  |
| 8 | 8.2853 | 1.2258 | 2.1042 | 17.02 |
| 9 | 14.6716 | D9 |  |  |
| 10* | 4.4415 | 1.5114 | 1.589 | 61.05 |
| 11* | −12.6054 | 0.1033 |  |  |
| 12 | 5.261 | 0.9848 | 1.6258 | 35.74 |
| 13 | 44.6425 | 0.35 | 1.805 | 25.45 |
| 14 | 3.1631 | D14 |  |  |

TABLE 25-continued

| Number of lens surface | Radius of curvature | Thickness | nd | vd |
|---|---|---|---|---|
| 15* | 32.3776 | 1.6995 | 1.5312 | 56.51 |
| 16* | −12.8361 | D16 | | |
| 17 | ∞ | 0.21 | 1.5168 | 64.20 |
| 18 | ∞ | 0.3 | | |
| 19 | ∞ | 0.3 | 1.5168 | 64.20 |
| 20 | ∞ | D20 | | |
| 21 | ∞ | | | |

The following table 26 shows aspherical lens coefficients in an embodiment.

TABLE 26

| Number of lens surface | K | A | B | C | D |
|---|---|---|---|---|---|
| 3 | 0.000000 | 1.459650e−005 | 1.684941e−008 | −3.870249e−010 | 0.000000e+000 |
| 6 | 10.000000 | −2.347637e−003 | 1.304408e−004 | −3.035511e−006 | 5.383683e−008 |
| 7 | 0.221769 | −2.660925e−003 | 1.544761e−004 | −3.716309e−006 | 5.186998e−008 |
| 10 | −0.602387 | −3.332244e−004 | −1.216785e−005 | 1.203706e−005 | −9.609274e−007 |
| 11 | −9.666090 | 2.462528e−004 | 1.020991e−005 | 1.173059e−005 | −1.365904e−006 |
| 15 | −10.000000 | 1.210870e−003 | −1.416792e−004 | 8.200218e−006 | −1.731152e−007 |
| 16 | −0.565036 | 1.870443e−003 | −2.117025e−004 | 1.120983e−005 | −2.219194e−007 |

The following table 27 shows a variable distance during zooming of the zoom lens of FIG. 13 in an embodiment.

TABLE 27

| Variable distance | Wide angle position | Normal position | Telephoto position |
|---|---|---|---|
| D3 | 0.506 | 5.098 | 13.143 |
| D9 | 11.564 | 5.037 | 0.5 |
| D14 | 4.234 | 12.325 | 17.511 |
| D16 | 3.781 | 3.057 | 2.685 |
| D20 | 0.236 | 0.56 | 0.38 |

The following table 28 shows lens data of the zoom lens of FIG. 13 in an embodiment.

TABLE 28

| | Wide angle position | Normal position | Telephoto position |
|---|---|---|---|
| EFL | 4.7191 | 13.686 | 43.4578 |
| FNo | 3.447 | 5.403 | 6.99 |
| OAL | 33.2076 | 38.999 | 47.1341 |
| ANG | 41.2597 | 16.0217 | 5.1674 |
| BFL (in air) | 4.6255 | 4.2614 | 3.7021 |

Figure 14A:
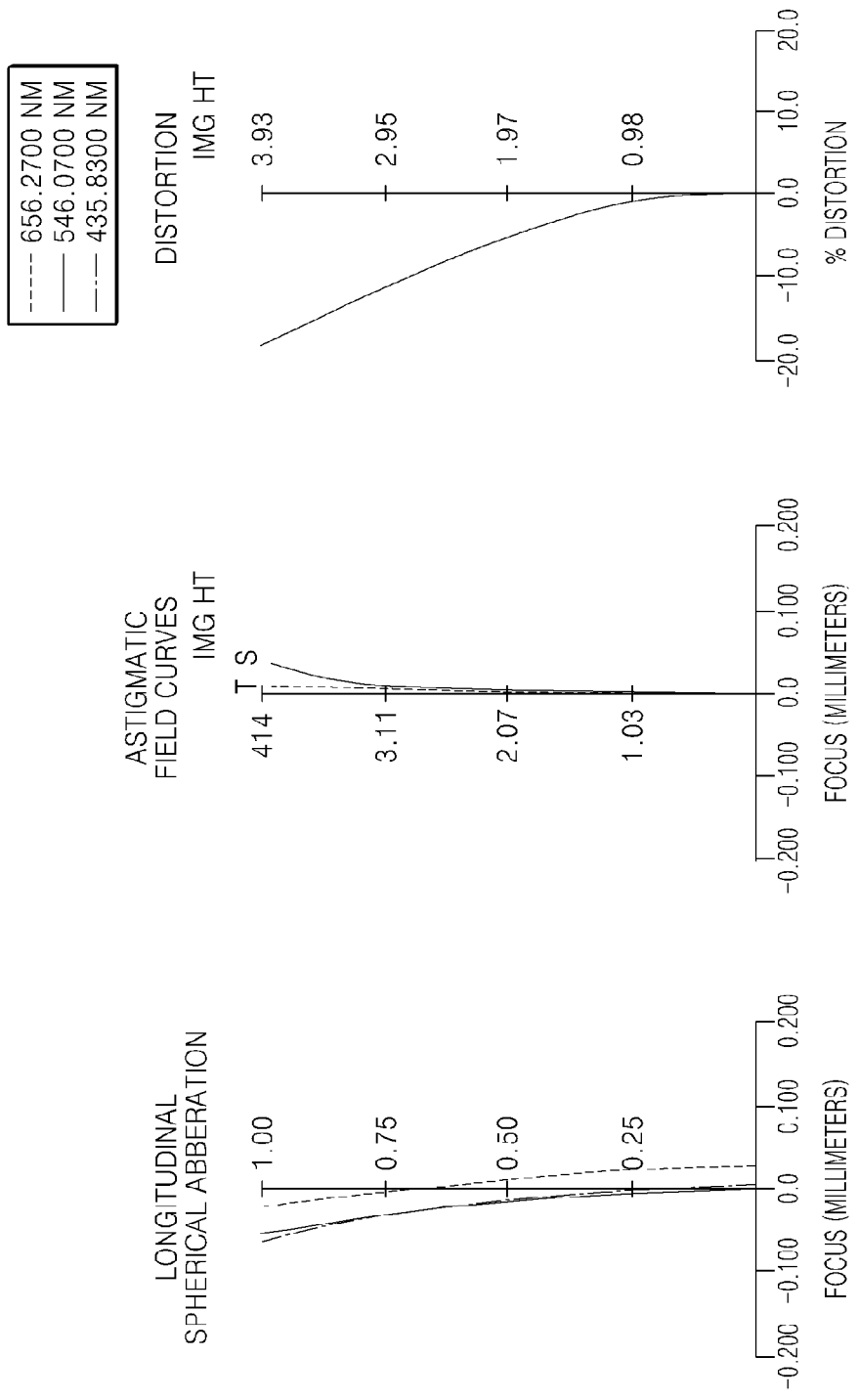
FIGS. 14A and 14B are aberration charts for a wide angle position and a telephoto position of the zoom lens of FIG. 13, respectively.
Figure 14B:
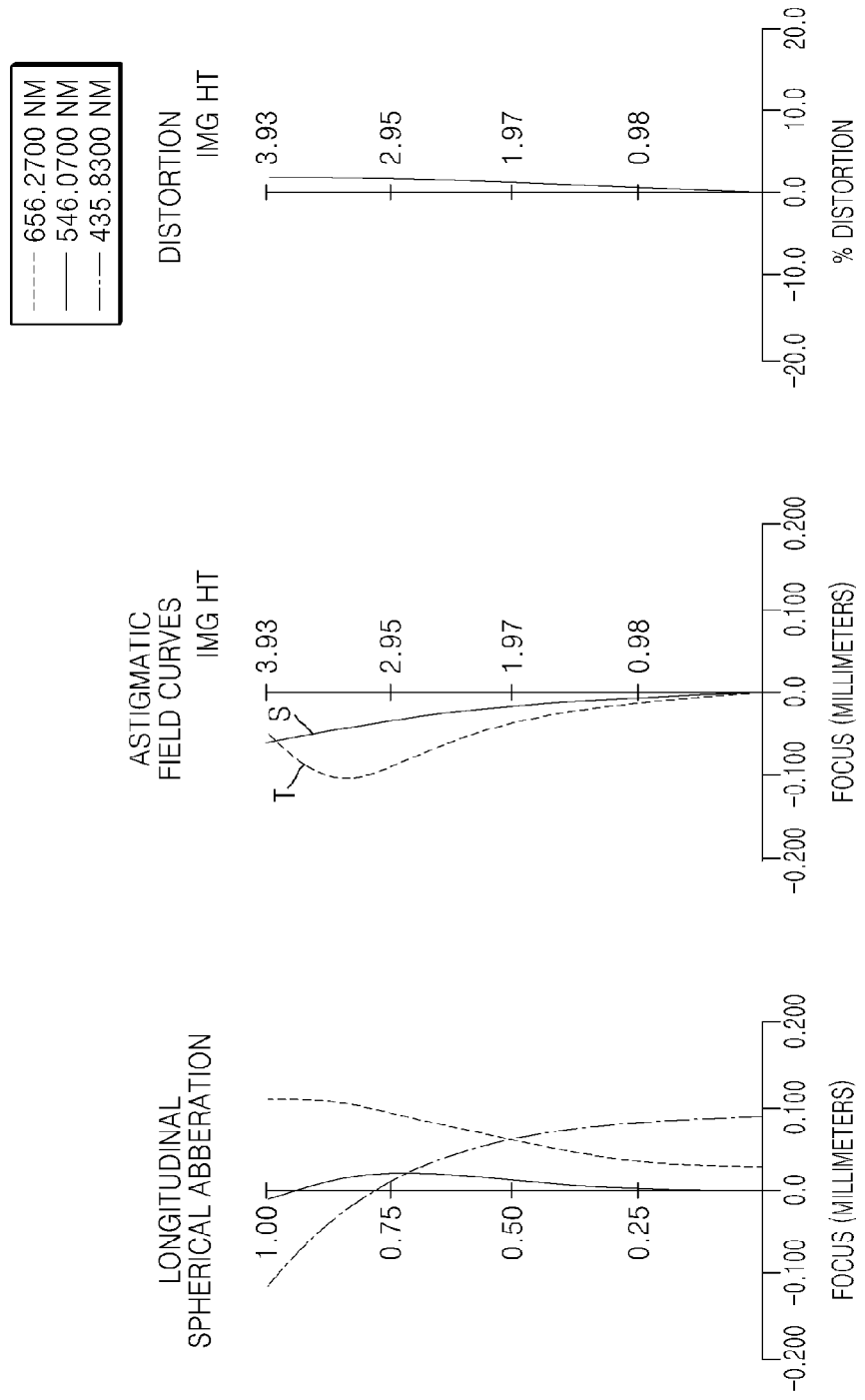

FIGS. 14 and 14B show longitudinal spherical aberration, astigmatic field curves, and distortion in a wide angle position and a telephoto position of the zoom lens of FIG. 13, respectively, according to an embodiment.

Embodiment 8

Figure 15:
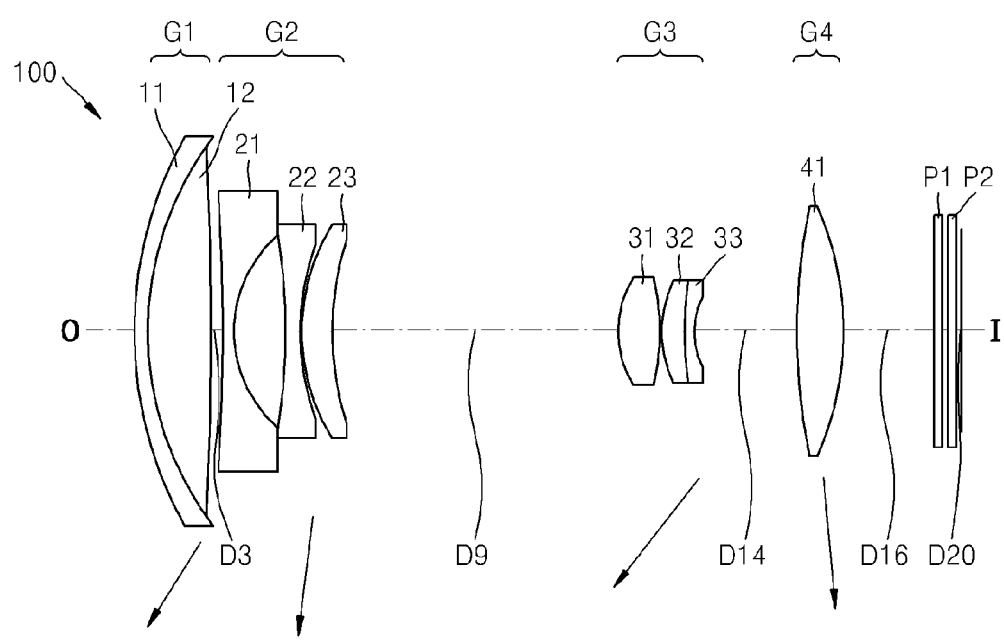
FIG. 15 is a cross-sectional view of a zoom lens according to another embodiment.

FIG. 15 illustrates a zoom lens according to an eighth embodiment, and the following table 29 shows design data of the zoom lens of FIG. 15 in an embodiment.

TABLE 29

| Number of lens surface | Radius of curvature | Thickness | nd | vd |
|---|---|---|---|---|
| 1 | 16.5409 | 0.5 | 1.92286 | 20.88 |
| 2 | 13.0148 | 2.545 | 1.61738 | 63.71 |
| 3* | −138.4737 | D3 | | |
| 4 | −60.2075 | 0.40 | 1.8061 | 40.73 |
| 5 | 5.3216 | 2.042 | | |
| 6* | −310.7674 | 0.5951 | 1.5147 | 63.78 |
| 7* | 8.1927 | 0.1 | | |
| 8 | 8.1309 | 1.2264 | 2.1042 | 17.02 |
| 9 | 14.4664 | D9 | | |
| 10* | 4.4841 | 1.606 | 1.589 | 61.05 |
| 11* | −12.592 | 0.1 | | |
| 12 | 5.017 | 0.9431 | 1.6258 | 35.74 |
| 13 | 54.4772 | 0.35 | 1.805 | 25.45 |
| 14 | 3.1378 | D14 | | |
| 15* | 32.3776 | 1.7196 | 1.5312 | 56.51 |
| 16* | −12.6369 | D16 | | |
| 17 | ∞ | 0.21 | 1.5168 | 64.20 |
| 18 | ∞ | 0.3 | | |
| 19 | ∞ | 0.5 | 1.5168 | 64.20 |
| 20 | ∞ | D20 | | |
| 21 | ∞ | | | |

The following table 30 shows aspherical lens coefficients in an embodiment.

TABLE 30

| Number of lens surface | K | A | B | C | D |
|---|---|---|---|---|---|
| 3 | 0 | 1.50E−05 | 1.49E−08 | −3.76E−10 | 0.00E+00 |
| 6 | 10 | −2.36E−03 | 1.30E−04 | −2.86E−06 | 5.26E−08 |
| 7 | 0.113715 | −2.70E−03 | 1.57E−04 | −3.79E−06 | 5.60E−08 |
| 10 | −0.59372 | −3.20E−04 | −9.92E−06 | 1.23E−05 | −1.17E−06 |
| 11 | −9.68409 | 2.46E−04 | 7.71E−06 | 1.12E−05 | −9.04E−07 |

TABLE 30-continued

| Number of lens surface | K | A | B | C | D |
|---|---|---|---|---|---|
| 15 | −10 | 1.22E−03 | −1.42E−04 | 8.26E−06 | −1.72E−07 |
| 16 | −0.62022 | 1.87E−03 | −2.11E−04 | 1.12E−05 | −2.20E−07 |

The following table 31 shows a variable distance during zooming of the zoom lens of FIG. 15 in an embodiment.

TABLE 31

| Variable distance | Wide angle position | Normal position | Telephoto position |
|---|---|---|---|
| D3 | 0.493 | 5.333 | 13.335 |
| D9 | 11.458 | 5.123 | 0.5 |
| D14 | 4.177 | 12.027 | 17.335 |
| D16 | 3.781 | 30.57 | 2.685 |
| D20 | 0.206 | 0.503 | 0.405 |

The following table 32 shows lens data of the zoom lens of FIG. 15 in an embodiment.

TABLE 32

| | Wide angle position | Normal position | Telephoto position |
|---|---|---|---|
| EFL | 4.6094 | 13.3673 | 43.7896 |
| FNo | 3.38 | 5.387 | 6.831 |
| OAL | 33.0357 | 39.001 | 47.2072 |
| ANG | 41.9288 | 16.3834 | 5.1284 |
| BFL (in air) | 4.5959 | 4.2053 | 3.7258 |

Figure 16A:
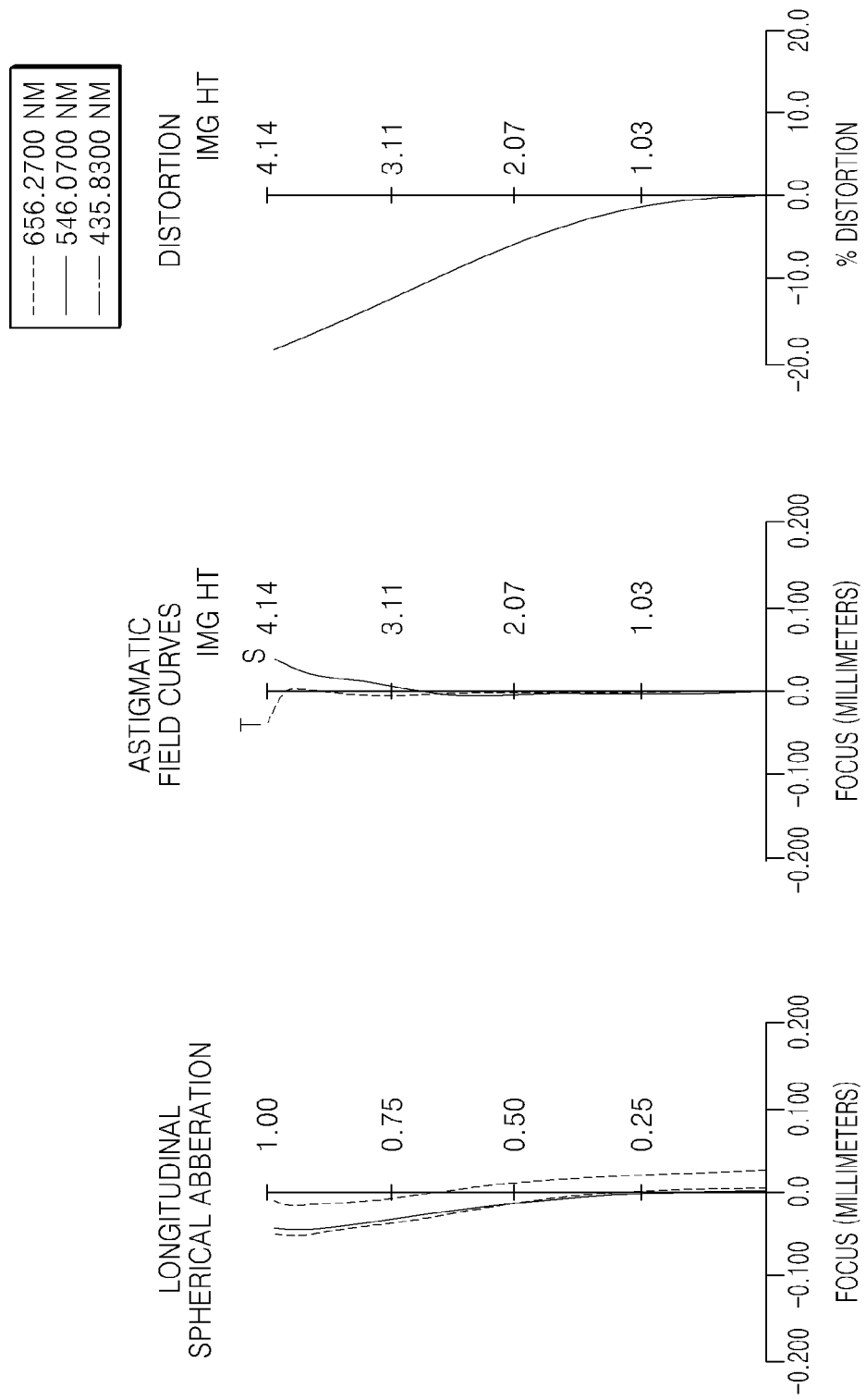
FIGS. 16A and 16B are aberration charts for a wide angle position and a telephoto position of the zoom lens of FIG. 15, respectively.
Figure 16B:
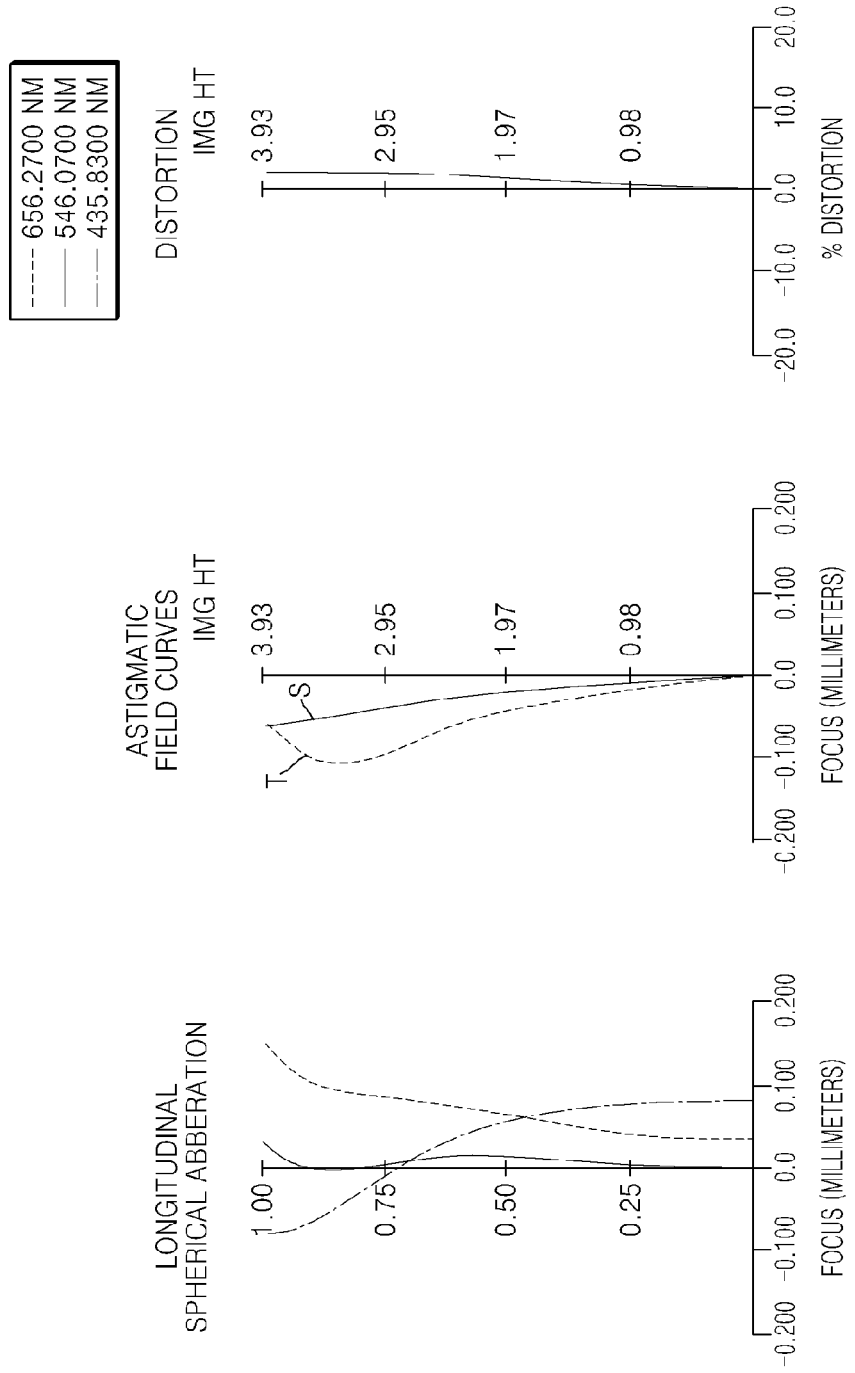

FIGS. 16A and 16B show longitudinal spherical aberration, astigmatic field curves, and distortion in a wide angle position and a telephoto position of the zoom lens of FIG. 13, respectively, according to an embodiment.

The following table 33 shows that the first through eighth embodiments satisfy the above Expressions 1 through 13.

TABLE 33

| Expression | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| (1) (D/Z)/fw < 0.32 | 0.283 | 0.281 | 0.284 | 0.287 | 0.277 | 0.266 | 0.279 | 0.277 |
| (2) (Dt/Z)/fw < 1.3 | 1.124 | 1.107 | 1.124 | 1.124 | 1.104 | 1.078 | 1.085 | 1.078 |
| (3) 0 < R1/R2 < 2.5 | 2.343 | 2.000 | 2.392 | 2.300 | 2.299 | 2.064 | 2.301 | 2.300 |
| (4) nG1 > 1.9 | 1.923 | 1.965 | 1.923 | 1.923 | 1.923 | 1.923 | 1.923 | 1.923 |
| (5) nG5 > 2.0 | 2.104 | 2.104 | 2.104 | 2.104 | 2.104 | 2.104 | 2.104 | 2.104 |
| (6) L/ft < 0.7 | 0.675 | 0.621 | 0.658 | 0.673 | 0.663 | 0.654 | 0.656 | 0.654 |
| (7) f1/fw < 6.0 | 5.766 | 5.604 | 5.762 | 5.746 | 5713 | 5.643 | 5.781 | 5.886 |
| (8) f1/ft < 0.7 | 0.670 | 0.651 | 0.670 | 0.668 | 0.649 | 0.627 | 0.628 | 0.620 |
| (9) |f2/fw| < 1.3 | 1.292 | 1.297 | 1.298 | 1.250 | 1.246 | 1.249 | 1.250 | 1.250 |
| (10) f2/ft < 0.16 | 0.150 | 0.151 | 0.151 | 0.145 | 0.142 | 0.139 | 0.136 | 0.132 |
| (11) D1(w-t)/Z < 1.7 | 1.560 | 1.442 | 1.521 | 1.64 | 1.572 | 1.522 | 1.512 | 1.492 |
| (12) D2(w-t)/Z < 0.15 | 0.130 | 0.036 | 0.096 | 0.140 | 0.139 | 0.139 | 0.140 | 0.140 |
| (13) 2.80 < Fno_w < 3.5 | 2.80 | 3.17 | 3.42 | 3.40 | 3.41 | 3.45 | 3.45 | 3.38 |

The zoom lens according to the first through eighth embodiments may have a small size, low price and high magnification. The zoom lens according to the first through eighth embodiments may be applied to a digital camera, a video camera, or a portable terminal that uses a solid state imaging device, such as a charge coupled device (CCD) or a complementary metal oxide semiconductor (CMOS).

Due to a limitation in miniaturization of an image sensor or electronic parts, miniaturization of the various embodiments of the zoom lens may facilitate miniaturization of a camera or other electronic device in which the zoom lens is incorporated. With a retractable type lens barrel, for example, the lens is moved to a predetermined position when photographing is performed, and, when photographing is not performed, the lens is accommodated inside of the camera. In a photographing apparatus that employs the retractable type lens barrel, a distance between lens groups needs to be reduced as much as possible when the lens barrel is accommodated, so that the thickness of the camera may be reduced and portability may be improved. In the first through eighth embodiments, a lens formed of a high refractive material and a plurality of aspherical surfaces may be employed so as to minimize the thickness of the lens and to minimize an optical overall length of the zoom lens in the wide angle position and in the telephoto position. Such an arrangement allows the zoom lens to have a small size. The zoom lens according to the first through eighth embodiments may have a 8× or more zoom ratio and may obtain an FOV of 80° in the wide angle position. For example, the zoom lens may have an 8× or more and 12× or less zoom ratio. At least one plastic lens may be provided to reduce costs.

Figure 17:
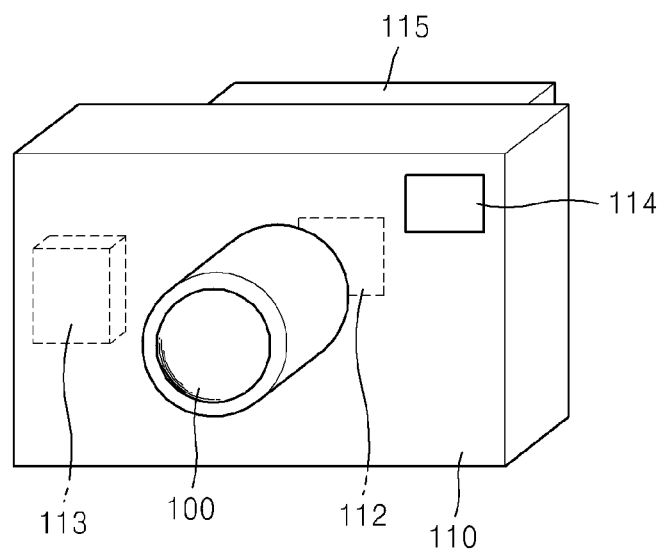
FIG. 17 illustrates an electronic apparatus according to an embodiment.

FIG. 17 illustrates an electronic apparatus which, in this embodiment, is a photographing apparatus 110. The photographing apparatus 110 includes a zoom lens and an imaging sensor 112 that receives an optical image formed by the zoom lens 100 and converts the received optical image into an electrical image signal. The zoom lens 100 may be zoom lenses described with reference to FIGS. 1 through 16. The photographing apparatus 110 may further include a recording unit 113 on which information corresponding to a subject image that is photoelectrically transformed from the imaging sensor 112 is recorded, and a view finder 114 for observing the subject image. Also, the photographing apparatus 110 may further include a display unit 115 on which the subject image is displayed. Here, the view finder 114 and the display unit 115 are separately provided. However, the display unit 115 may be provided without the view finder 114. The photographing apparatus 110 illustrated in FIG. 17 is merely illustrative, and the disclosure is not limited thereto. The photographing apparatus 110 of FIG. 17 may be applied to a camera, an optical device for a mobile phone, and a camera for a smart phone. The zoom lens according to the one or more embodiments may be used in a photographing apparatus, such as a digital camera or a mobile phone so that a photographing apparatus having a small size and that is capable of photographing with a bright and high performance may be implemented.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments. In the description of the embodiments, certain detailed explanations of related art are omitted when it is deemed that they may unnecessarily obscure the essence of the disclosure.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description but by the following claims, and all differences within the scope will be construed as being included in the disclosure.

No item or component is essential to the practice of the embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens comprising, in an order from an object side to an image side:
    a first lens group having a positive refractive power;
    a second lens group having a negative refractive power;
    a third lens group having a positive refractive power; and
    a fourth lens group having a positive refractive power,
    wherein, when zooming is performed from a wide angle position to a telephoto position, the first through fourth lens groups move, and
    wherein the first lens group comprises a first negative lens and a second positive lens from the object side, the second lens group comprises a third negative lens, a fourth negative lens, and a fifth positive lens, and the third negative lens comprises a concave surface at an object side thereof,
    wherein $(D/Z)/fw<0.32$ $(Dt/Z)/fw<1.3$ $0<R1/R2<2.5$ $nG5>2.0$ where Dt is an optical overall length of the zoom lens in the telephoto position, Z is a zoom ratio, D is a sum of thicknesses of entire lenses of the first through fourth lens groups, R1 is a radius of curvature of the image side of the second positive lens of the first lens group, R2 is a radius of curvature of the object side of the third negative lens of the second lens group, fw is a focal length in the wide angle position, and nG5 is a refractive index of the fifth positive lens of the second lens group.

2. The zoom lens of claim 1, wherein:

$nG1>1.9$ where nG1 is a refractive index of the first negative lens of the first lens group.

3. The zoom lens of claim 1, wherein:

$L/ft<0.7$ $f1/fw<6.0$ $f1/ft<0.7$ where L is a sum of movement distances of the first through fourth lens groups when zooming is performed from the wide angle position to the telephoto position, ft is a focal length in the telephoto position, f1 is a focal length of the first lens group, and fw is a focal length in the wide angle position.

4. The zoom lens of claim 1, wherein:

$|f2/fw|<1.3$ $f2/ft<0.16$, where f2 is a focal length of the second lens group.

5. The zoom lens of claim 1, wherein the third lens group comprises doublet lenses.

6. The zoom lens of claim 1, wherein:

$D1(w-t)/Z<1.7$ $D2(w-t)/Z<0.15$ where D1(w–t) is a movement distance of the first lens group when zooming is performed from the wide angle position to the telephoto position, and D2(w–t) is a movement distance of the second lens group when zooming is performed from the wide angle position to the telephoto position.

7. The zoom lens of claim 1, wherein each of the first through fourth lens groups comprises at least one aspherical surface.

8. The zoom lens of claim 1, wherein:

$$2.8 < Fno\_w < 3.5$$

where Fno_w is Fno in the wide angle position.

9. The zoom lens of claim 1, wherein, when the zoom lens performs zooming, a distance between the first lens group and the second lens group increases, a distance between the second lens group and the third lens group is reduced, and a distance between the third lens group and the fourth lens group increases.

10. The zoom lens of claim 1, wherein the fourth lens group performs focusing according to a variation in a distance from an object.

11. The zoom lens of claim 1, wherein the fourth lens group comprises plastic lenses.

12. The zoom lens of claim 1, wherein the zoom lens has an 8× or more and 12× or less zoom ratio.

13. The zoom lens of claim 1, wherein the first negative lens and the second positive lens are cemented as doublet lenses.

14. The zoom lens of claim 1, wherein the third negative lens and the fourth negative lens are bi-concave lenses.

15. An electronic apparatus comprising:
a zoom lens; and
an imaging device that receives an image formed by the zoom lens,
wherein the zoom lens comprises, in an order from an object side to an image side:
a first lens group having a positive refractive power;
a second lens group having a negative refractive power;
a third lens group having a positive refractive power; and
a fourth lens group having a positive refractive power,
wherein, when zooming is performed from a wide angle position to a telephoto position, the first through fourth lens groups move,
wherein the first lens group includes a first negative lens and a second positive lens from the object side, the second lens group includes a third negative lens, a fourth negative lens, and a fifth positive lens, and the third negative lens includes a concave surface at an object side thereof,
wherein:

$$(D/Z)/fw < 0.32$$

$$(Dt/Z)/fw < 1.3$$

$$0 < R1/R2 < 2.5$$

$$nG5 > 2.0$$

where Dt is an optical overall length of the zoom lens in the telephoto position, Z is a zoom ratio, D is a sum of thicknesses of entire lenses of the first through fourth lens groups, R1 is a radius of curvature of the image side of the second positive lens of the first lens group, R2 is a radius of curvature of the object side of the third negative lens of the second lens group, fw is a focal length in the wide angle position, and nG5 is a refractive index of the fifth positive lens of the second lens group.

* * * * *